United States Patent
Lestideau

(10) Patent No.: US 7,352,881 B2
(45) Date of Patent: Apr. 1, 2008

(54) METHOD FOR TRACKING FACIAL FEATURES IN A VIDEO SEQUENCE

(75) Inventor: Fabrice Lestideau, Manly (AU)

(73) Assignee: Canon Kabushiki Kaisha, Tokyo (JP)

( * ) Notice: Subject to any disclaimer, the term of this patent is extended or adjusted under 35 U.S.C. 154(b) by 798 days.

(21) Appl. No.: 10/663,689

(22) Filed: Sep. 17, 2003

(65) Prior Publication Data

US 2004/0109584 A1  Jun. 10, 2004

(30) Foreign Application Priority Data

Sep. 18, 2002  (AU) .............................. 2002951473

(51) Int. Cl.
*G06K 9/00* (2006.01)

(52) U.S. Cl. .................. 382/103; 382/118; 382/171; 382/190; 348/169

(58) Field of Classification Search ................ 382/103, 382/118, 164, 224, 159, 190, 209, 116, 154, 382/254, 107, 171, 195, 201, 236, 123; 446/321; 704/246, 249; 150/103, 104; 348/169, 154, 348/155; 706/20; 383/106
See application file for complete search history.

(56) References Cited

U.S. PATENT DOCUMENTS

| | | | |
|---|---|---|---|
| 5,864,630 A * | 1/1999 | Cosatto et al. ............. 382/103 |
| 6,118,887 A * | 9/2000 | Cosatto et al. ............. 382/103 |
| 6,707,933 B1 * | 3/2004 | Mariani et al. ............. 382/118 |
| 7,020,305 B2 * | 3/2006 | Liu et al. .................... 382/107 |
| 2003/0053685 A1 | 3/2003 | Lestideau |

OTHER PUBLICATIONS

Behzad Dariush et al., Spatiotemporal analysis of face profiles : detection, segmentation and registration.*

* cited by examiner

*Primary Examiner*—Sheela Chawan
(74) *Attorney, Agent, or Firm*—Fitzpatrick, Cella, Harper & Scinto

(57) ABSTRACT

A method (100) of tracking facial features in a video sequence is disclosed. The method receives (110) as input facial features for tracking in a first frame of the video sequence. The video sequence is also segmented (120) using spatiotemporal segmentation to provide a sequence of associated two-dimensional segments, with a first segment in the sequence of associated two-dimensional segments including the facial features for tracking. Candidate facial features are then identified (140) in at least a second two-dimensional segment in the sequence of associated segments. Method (100) then verifies (155) which of the candidate facial features correspond with the facial features for tracking. Method (100) also recovers lost facial features by using known geometric relations between facial features.

12 Claims, 14 Drawing Sheets

METHOD FOR TRACKING FACIAL FEATURES IN A VIDEO SEQUENCE

CROSS-REFERENCE TO RELATED PATENT APPLICATION

This application claims the right of priority under 35 U.S.C. § 119 based on Australian Patent Application No. 2002951473, filed Sep. 18, 2003, which is incorporated by reference herein in its entirety as if fully set forth herein.

FIELD OF THE INVENTION

The present invention relates generally to video processing and, in particular, to the tracking of facial features in a video sequence. The term "facial features" refers particularly to the eyes and the mouth of a face.

BACKGROUND

Interpretation of a video sequence for human-machine interaction purposes is a problem often encountered in the image processing industry. Face tracking is an important aspect of the interpretation of video sequences, and can be classified as a high level problem. However, merely tracking the face is often not enough in certain types of applications. For example, in face recognition applications, the positions of the eyes and the mouth are needed to enable a recognition algorithm to operate. Another example of where the positions of the eyes and the mouth are needed is an eyes/head control interface. In such an interface the movement of the head is used for control of a cursor, instead of a mouse for example. Further examples include virtual reality applications and video games.

A number of techniques have been proposed for tracking facial features. The most common technique uses skin colour to detect and track a face segment. The eyes and the mouth are then detected inside this skin coloured segment. Eye blinking, valley detection, and pattern matching using principal component analysis are some of the techniques used to locate the eyes. Most of these techniques rely on a frame by frame basis feature detection. Furthermore, skin detection based on the colour of skin is known to be highly unreliable under changing lighting conditions.

Many techniques use luminance block matching in order to track the features. Such techniques give good results as long as the features are visible throughout the video. If one or more feature disappear, it is not possible to detect these features again when they reappear in the video.

Other prior art techniques use deformable wireframe models and motion information to track the whole face and its features. Some of those techniques are able to track the features even in a side view of the face, but require a large amount of computation power.

Yet another technique is based on the "red eye" effect, often seen in a photograph where a flash was used and is caused by the reflection of light from the retina of the eye. Because the reflection only occurs when the person more or less faces the camera, this technique has only limited application.

SUMMARY

It is an object of the present invention to substantially overcome, or at least ameliorate, one or more disadvantages of existing arrangements.

According to a first aspect of the invention, there is provided a method of tracking facial features in a video sequence, said method comprising the steps of:
(a) receiving facial features for tracking in a first frame of said video sequence;
(b) spatiotemporally segmenting said video sequence to provide a sequence of associated two-dimensional segments, a first segment in said sequence of associated two-dimensional segments including said facial features for tracking;
(c) identifying candidate facial features in at least a second two-dimensional segment in said sequence of associated segments; and
(d) verifying which of said candidate facial features correspond with said facial features for tracking.

According to another aspect of the invention, there is provided a method of tracking facial features in a sequence of associated two-dimensional segments, a first segment in said sequence of associated two-dimensional segments including facial features for tracking, said method comprising the steps of:
(a) identifying candidate facial features in at least a second two-dimensional segment in said sequence of associated segments;
(b) verifying which of said candidate facial features correspond with said facial features for tracking; and
(c) recovering lost facial features by using known geometric relations between facial features.

According to another aspect of the invention, there is provided an apparatus for implementing any one of the aforementioned methods.

According to another aspect of the invention there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1:
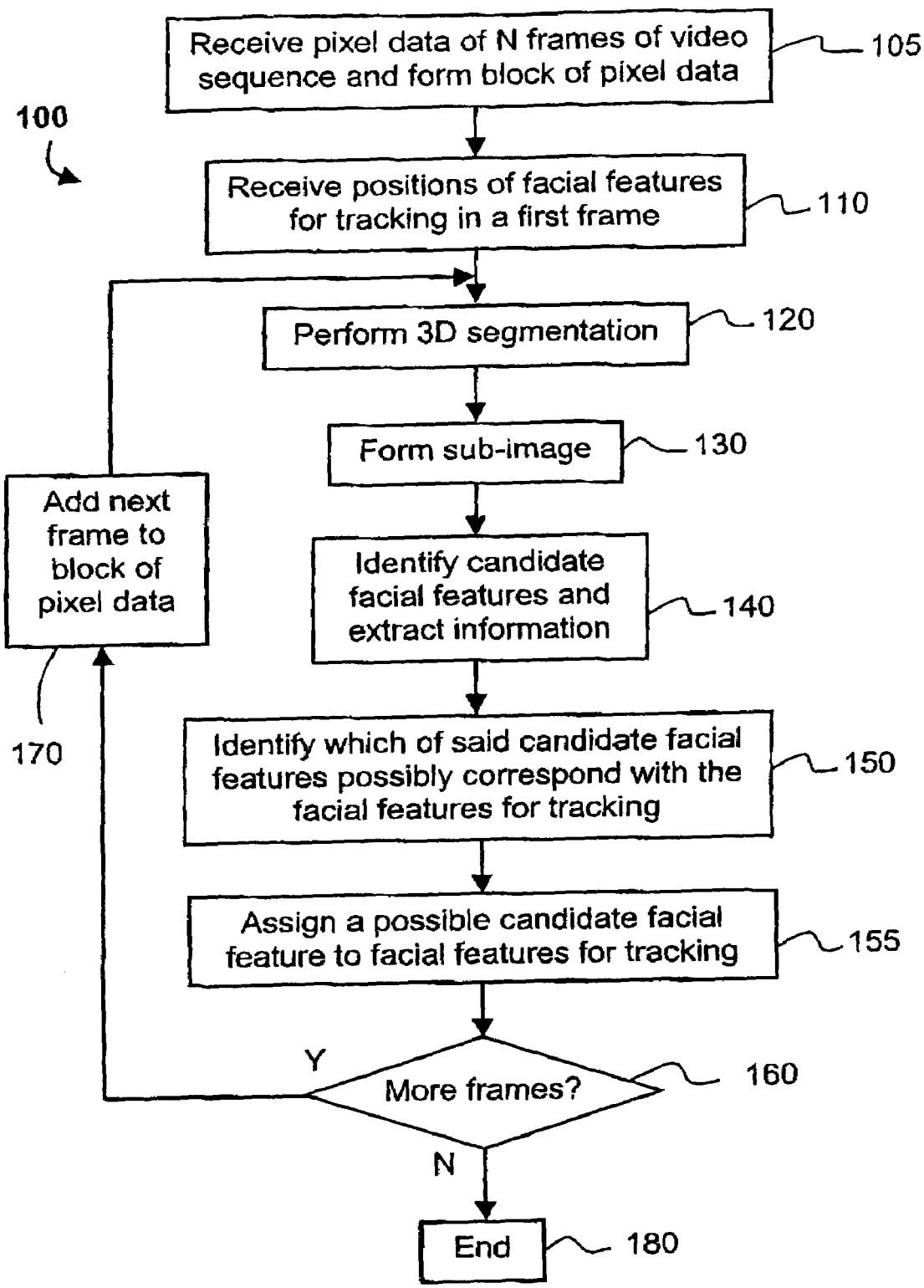
FIG. 1 shows a flow diagram of a method of tracking facial features in a video sequence.

Where reference is made in any one or more of the accompanying drawings to steps and/or features, which have the same reference numerals, those steps and/or features have for the purposes of this description the same function (s) or operation(s), unless the contrary intention appears.

Some portions of the description that follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities.

Figure 2:
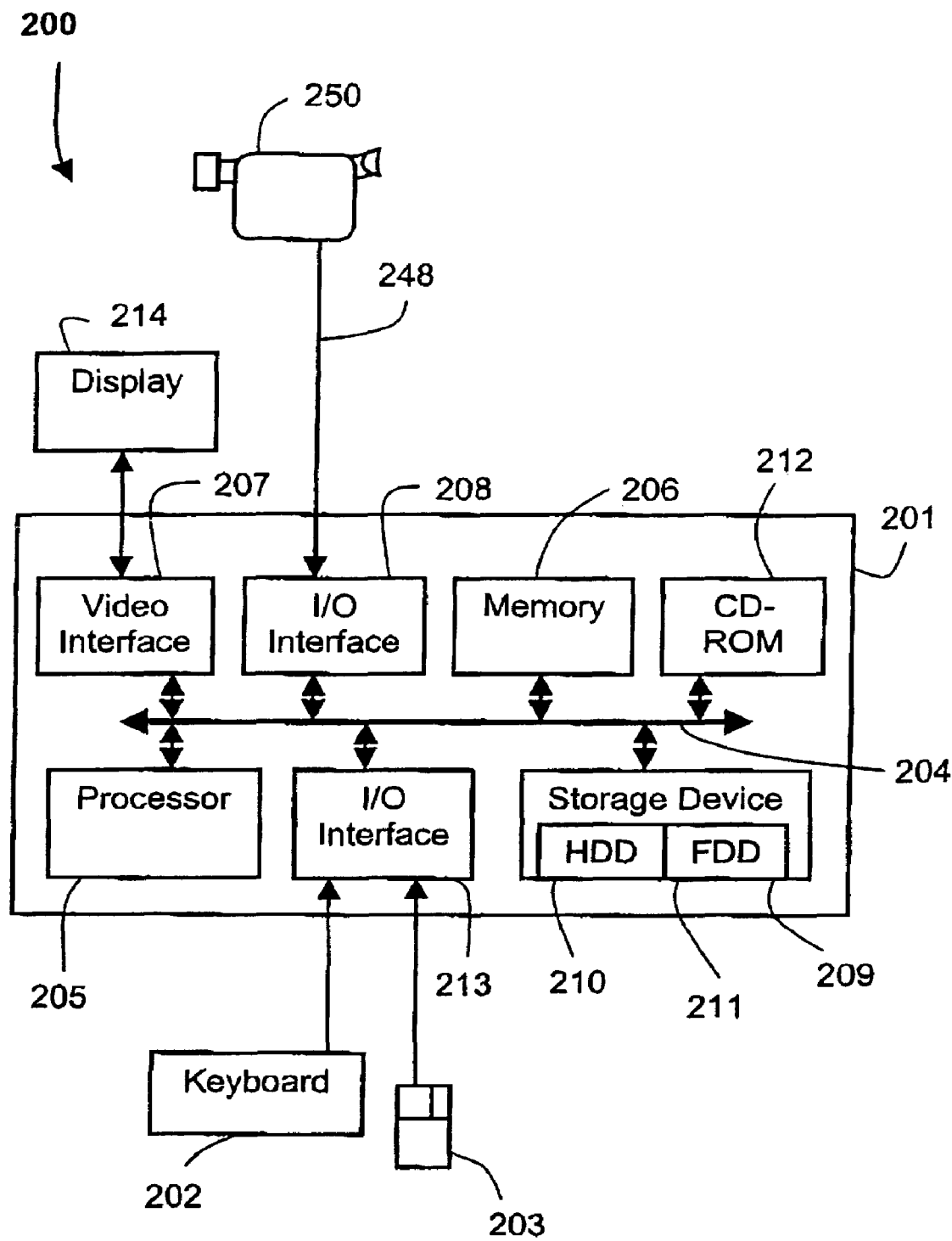
FIG. 2 shows a programmable device for performing the operations of the method shown in FIG. 1.

FIG. 1 shows a flow diagram of a method 100 of tracking facial features in a video sequence, the facial features being the eyes and the mouth of a human face. For ease of explanation, the steps of method 100 are described with reference to the tracking of the facial features of a single face. However, it is not intended that the present invention be limited to tracking the facial features of only one face, as the described method may be used on any number of faces. FIG. 2 shows a programmable device 200 for performing the operations of the method 100 described in detail below. Such a programmable device 200 may be specially constructed for the required purposes, or may comprise a general-purpose computer or other device selectively activated or reconfigured by a computer program stored in the computer or device The algorithms presented herein are not inherently related to any particular computer or other apparatus.

The programmable device 200 comprises a computer module 201, input devices such as a camera 250, a keyboard 202 and mouse 203, output devices including a display device 214. The computer module 201 typically includes at least one processor unit 205, a memory unit 206, for example formed from semiconductor random access memory (RAM) and read only memory (ROM), input/output (I/O) interfaces including a video interface 207, and an I/O interface 213 for the keyboard 202 and mouse 203, and an interface 208 for the camera 250 through connection 248. A storage device 209 is provided and typically includes a hard disk drive 210 and a floppy disk drive 211. A CD-ROM drive 212 is typically provided as a non-volatile source of data. The components 205 to 213 of the computer module 201, typically communicate via an interconnected bus 204 and in a manner which results in a conventional mode of operation of the programmable device 200 known to those in the relevant art.

The method may be implemented as software, such as an application program executing within the programmable device 200. The application program may be stored on a computer readable medium, including the storage devices 209. The application program is read into the computer 200 from the computer readable medium, and then executed by the processor 205. Intermediate storage of the program and any data fetched from the camera 250 may be accomplished using the semiconductor memory 206, possibly in concert with the hard disk drive 210.

Referring again to FIG. 1, the steps of method 100 are effected by instructions in the application program that are executed by the processor 205 of the programmable device 200 (FIG. 2).

The method 100 starts in step 105 where the computer module 201 receives as input pixel data of N frames of a video sequence and forms a "block" of pixel data. The pixel data of the video sequence includes at each frame interval n, a two dimensional array of colour values $\phi(x,y,n)$, typically from an image sensor, such as that in camera 250 (FIG. 2).

The colour values $\phi(x,y,n)$ may be received directly from camera 250 and stored on the storage device 209 (FIG. 2).

Figure 7:
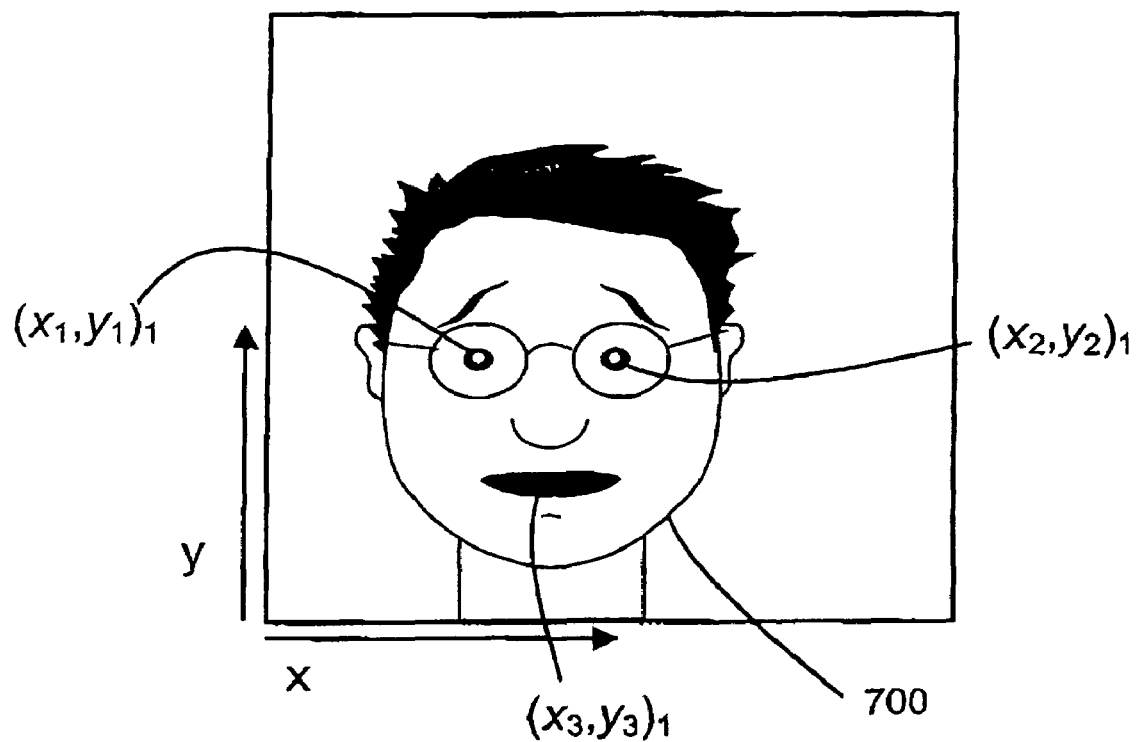
FIG. 7 shows a schematic of a face displayed in a frame, the coordinate system used, an the respective image coordinates of the left eye, right eye and mouth.

Next, in step 110, the processor 205 receives as input image coordinates $(x_k,y_k)_1$ in a first frame of the video sequence, with image coordinates $(x_1, y_1)_1$, $(x_2,y_2)_1$ and $(x_3, y_3)_1$ corresponding with the positions of the left eye, right eye and mouth respectively that have to be tracked. FIG. 7 shows a schematic of a face 700 displayed in a frame, the coordinate system used, an the respective image coordinates $(x_k,y_k)_1$ of the left eye, right eye and mouth. In one implementation a user provides the image coordinates $(x_k,y_k)_1$ to the processor 205 by using the mouse 203 for pointing and clicking on the eyes and mouth respectively in the first frame that is displayed on the display device 214 (FIG. 2). In an alternative implementation, the image coordinates $(x_k,y_k)_1$ are provided to method 100 by an automatic face feature detection algorithm.

Step 120 follows wherein the processor 205 performs spatiotemporal (3D) segmentation of the colour values $\phi(x,y,n)$ in the block of pixel data to produce as output a set of three-dimensional segments $\{S_i\}$ having homogeneous colour. Any 3D-segmentation algorithm may be used in step 120. In the preferred implementation, the Mumford-Shah 3D-segmentation algorithm is used, which operates on the colour values $\phi(x,y,n)$ of the block of pixel data to relate every pixel in the block to one segment $S_i$. The 3D segmentation step 120 operates to segment the colour values $\phi(x,y,n)$ to the extent that the colour values $\phi(x,y,n)$ of the face containing the facial features to be tracked form one of the contiguous 3D segments $S_i$. The coordinates $(x_k,y_k)_t$ of the facial features being tracked in frame t have to be in that one of the contiguous 3D segments $S_i$. Accordingly, the search area in which the coordinates $(x_k,y_k)_t$ of the facial features may occur is greatly reduced by the 3D segmentation.

During segmentation, an assumption is made that each colour value $\phi(x,y,n)$ is associated with a particular state. The model used to define the states is decided upon in advance. Each state is defined by an unknown segment model parameter vector $\bar{a}_i$ of length c, with each state being assumed to be valid over the contiguous 3D segment $S_i$. The aim of segmentation is to identify the 3D segments $S_i$ and the model parameters $\bar{a}_i$ for each segment $S_i$.

A model vector of measurements $\gamma(x,y,n)$ over each segment $S_i$ is assumed to be a linear projection of the c-vector model parameter $\bar{a}_i$ for that segment $S_i$:

$$\gamma(x,y,n)=\theta(x,y,n)\bar{a}_i, (x,y,n)\in S_i \quad (1)$$

where $\theta(x,y,n)$ is an m by c matrix, which relates the state of segment $S_i$ to the model measurements $\gamma(x,y,n)$, thereby encapsulating the nature of the predefined model. In the colour video segmentation case, c=m and matrix $\theta(x,y,n)$ is the c by c identity matrix for all $(x,y,n)$.

Each vector of actual colour values $\phi(x,y,n)$ is subject to a random error $e(x,y,n)$ such that $$\phi(x,y,n)=\gamma(x,y,n)+e(x,y,n). \quad (2)$$

Further, the error $e(x,y,n)$ may be assumed to be drawn from a zero-mean normal (Gaussian) distribution with covariance $\Lambda(x,y,n)$:

$$e(x,y,n) \sim N(0,\Lambda(x,y,n)) \quad (3)$$

wherein $\Lambda(x,y,n)$ is a c by c covariance matrix. Each component of the error $e(x,y,n)$ is assumed to be independently and identically distributed, i.e.:

$$\Lambda(x,y,n)=\sigma^2(x,y,n)I_c \quad (4)$$

where $I_c$ is the c by c identity matrix.

Variational segmentation requires that a cost function E be assigned to each possible segmentation. A partition into segments $S_i$ may be compactly described by a binary function J(d) on the boundary elements, in which the value "1" is assigned to each boundary element d bordering a segment $S_i$. This function J(d) is referred to as a boundary map.

The cost function E used in the preferred implementation is one in which a model fitting error is balanced with an overall complexity of the model. The sum of the statistical residuals of each segment $S_i$ is used as the model fitting error. Combining Equations (1), (2), (3) and (4), the residual over segment $S_i$ as a function of the model parameters $a_i$ is given by:

$$E_i(a_i) = \sum_{(x,y,n)\in S_i} [\phi(x, y, n) - a_i]^T [\phi(x, y, n) - a_i] \quad (5)$$

The model complexity is simply the number of segment-bounding elements d. Hence the overall cost functional E may be defined as $$E(\gamma, J, \lambda) = \sum_i E_i(a_i) + \lambda \sum_d J(d), \quad (6)$$

where the (non-negative) parameter $\lambda$ controls the relative importance of the model fitting error and the model complexity. The contribution of the model fitting error to the cost functional E encourages a proliferation of segments, while the model complexity encourages few segments. The functional E must therefore balance the two components to achieve a reasonable result. The aim of variational segmentation is to find a minimising model measurement $\bar{\gamma}$ and a minimising boundary map $\bar{J}(d)$ of the overall cost functional E, for a given value of parameter $\lambda$.

Note that if the segment boundaries d are given as a valid boundary map J(d), the minimising model parameters $\bar{a}_i$ over each segment $S_i$ may be found by minimising the segment residuals $E_i$. This may be evaluated using a simple weighted linear least squares calculation. Given this fact, any valid boundary map J(d) will fully and uniquely describe a segmentation. Therefore, the cost function E may be regarded as a function over the space of valid edge maps (J-space), whose minimisation yields an optimal segment partition $\bar{J}_\lambda$ for a given parameter $\lambda$. The corresponding minimising model parameters $\bar{a}_i$ may then be assumed to be those which minimise the residuals $E_i$ over each segment $S_i$. The corresponding minimum residuals for segment $S_i$ will hereafter be written as $\bar{E}_i$.

If parameter $\lambda$ is low, many boundaries are allowed, giving "fine" segmentation. As parameter $\lambda$ increases, the segmentation gets coarser. At one extreme, the optimal segment partition $\bar{J}_0$, where the model complexity is completely discounted, is the trivial segmentation, in which every pixel constitutes its own segment $S_i$, and which gives zero model fitting error e. On the other hand, the optimal segment partition $\bar{J}_\infty$, where the model fitting error e is completely discounted, is the null or empty segmentation in which the entire block is represented by a single segment $S_i$. Somewhere between these two extremes lies the segmentation $\bar{J}_\lambda$ which will appear ideal in that the segments $S_i$ correspond to a semantically meaningful partition.

To find an approximate solution to the variational segmentation problem, a segment merging strategy is employed, wherein properties of neighbouring segments $S_i$ and $S_j$ are used to determine whether those segments come from the same model state, thus allowing the segments $S_i$ and $S_j$ to be merged into a single segment $S_{ij}$. The segment residual $E_{ij}$ also increases after any 2 neighbouring segments $S_i$ and $S_j$ are merged.

Knowing that the trivial segmentation is the optimal segment partition $\bar{J}_\lambda$ for the smallest possible parameter $\lambda$ value of 0, in segment merging, each pixel in the block is initially labelled as its own unique segment $S_i$, with model parameters $\bar{a}_i$ set to the colour values $\phi(x,y,n)$. Adjacent segments $S_i$ and $S_j$ are then compared using some similarity criterion and merged if they are sufficiently similar. In this way, small segments take shape, and are gradually built into larger ones.

The partitions $\bar{J}_\lambda$ before and after the merger differ only in the two segments $S_i$ and $S_j$. Accordingly, in determining the effect on the total cost functional E after such a merger, a computation may be confined to those segments $S_i$ and $S_j$. By examining Equations (5) and (6), a merging cost for the adjacent segment pair $\{S_i, S_j\}$ may be written as:

$$\tau_{ij} = \frac{\bar{E}_{ij} - (\bar{E}_i + \bar{E}_j)}{l(\delta_{ij})} \quad (7)$$

where $l(\delta_{ij})$ is the area of the common boundary between 3D segments $S_i$ and $S_j$. If the merging cost $\tau_{ij}$ is less than parameter $\lambda$, the merge is allowed.

A key to efficient segment growing is to compute the numerator of the merging cost $\tau_{ij}$ as fast as possible. Firstly, Equation (5) is rewritten as:

$$E_j(a_j) = (F_j - H_j a_j)^T (F_j - H_j a_j) \quad (8)$$

where:

$H_j$ is an ($v_j$c) by c matrix composed of the c by c identity matrices stacked on top of one another as (x,y,n) varies over segment $S_j$, with $v_j$ the number of pixels in segment $S_j$; and $F_j$ is a column vector of length ($v_j$c) composed of the individual colour value $\phi(x,y,n)$ vectors stacked on top of one another.

By weighted least square theory, the minimising model parameter vector $\bar{a}_j$ for the segment $S_j$ is given by the mean of the colour value $\phi(x,y,n)$ over segment $S_j$. The corresponding residual is given by $$\bar{E}_j = (F_j - H_j \bar{a}_j)^T (F_j - H_j \bar{a}_j) \quad (9)$$

When merging two segments $S_i$ and $S_j$, the "merged" matrix $H_{ij}$ is obtained by concatenating matrix $H_i$ with matrix $H_j$; likewise for matrix $F_{ij}$. These facts may be used to show that the best fitting model parameter vector $\bar{a}_{ij}$ for the merged segment $S_{ij}$ is given by:

$$\bar{a}_{ij} = \frac{(v_i \bar{a}_i - v_j \bar{a}_j)}{v_i + v_j} \quad (10)$$

The merged residual is given by:

$$\bar{E}_{ij} = \bar{E}_i + \bar{E}_j + (\bar{a}_i - \bar{a}_j)^T (\bar{a}_i - \bar{a}_j) \frac{v_i v_j}{v_i + v_j} \quad (11)$$

The merging cost $\tau_{ij}$ in Equation (7) may be computed as:

$$\tau_{ij} = \frac{\|\bar{a}_i - \bar{a}_j\|^2 \frac{v_i v_j}{v_i + v_j}}{l(\delta_{ij})} \quad (12)$$

from the model parameters of the segments $S_i$ and $S_j$ to be merged. If the merge is allowed, Equations (10) give the model parameter $\bar{a}_{ij}$ of the merged segment $S_{ij}$.

Note that under this strategy, only Equations (10) and (12) need to be applied throughout the merging process. Only the model parameters $\bar{a}_i$ for each segment $S_i$ are therefore required as segmentation proceeds. Further, neither the original colour values $\phi(x,y,n)$ nor the model structure itself (i.e. the matrices $\theta(x,y,n)$) are required.

Usually, when the merging cost $\tau_{ij}$ exceeds a predetermined threshold $\lambda_{stop}$ the segmentation stops. However, it is possible that the face containing the facial features to be tracked is still segmented in more than one segment $S_i$. This is typically caused by challenging lighting conditions, or shadows. To resolve this problem, the segment merging continues at least until the three facial features to be tracked form part of the same segment $S_i$. The first time step 120 is performed, the three facial features to be tracked are those identified in step 110 and occur in frame 1. In subsequent iterations, the three facial features are those verified as being the facial features in frame t, being the oldest frame in the block of pixel data.

Figure 3:
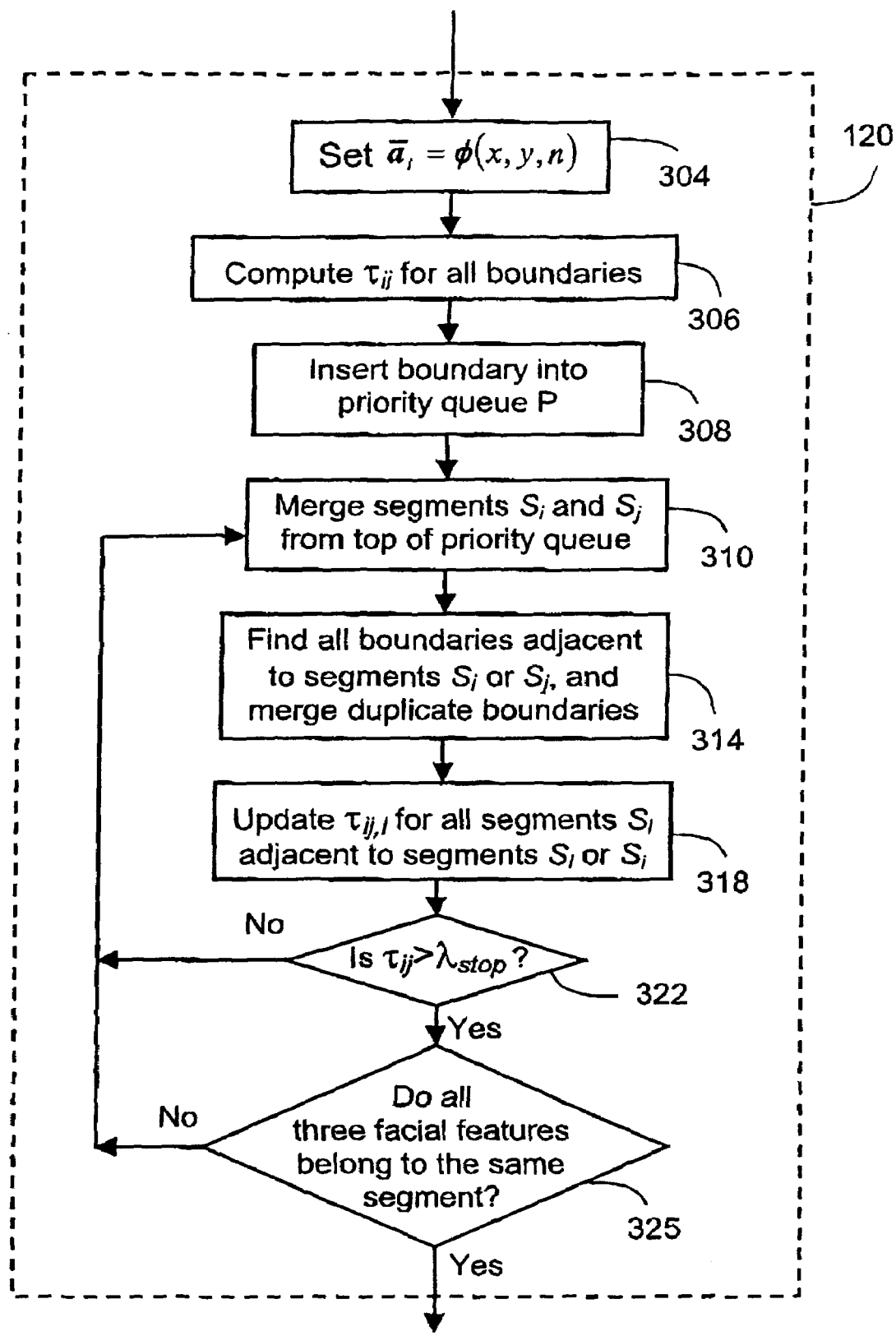
FIG. 3 shows the sub-steps of the 3D segmentation step in the method shown in FIG. 1.

FIG. 3 shows the sub-steps of the 3D segmentation step 120. The segmentation step 120 starts in sub-step 304 where the processor 205 sets the model parameters $\bar{a}_i(x,y,n)$ to the colour values $\phi(x,y,n)$ of each pixel in the block of N frames. Hence, the segmentation starts with the trivial segmentation where each pixel forms its own segment $S_i$. The processor 205 then determines in sub-step 306 all adjacent segment pairs $S_i$ and $S_j$, and computes the merging cost $\tau_{ij}$ according to Equation (12) for each of the boundaries between adjacent segment pairs $S_i$ and $S_j$. The boundaries with merging cost $\tau_{ij}$ are then inserted by the processor 205 in sub-step 308 into a priority queue P in priority order. The priority queue P is typically stored on the storing device 209 or memory 206.

The processor 205 retrieves the first entry from the priority queue P(1) and merges the corresponding segment pair $S_i$ and $S_j$ (i.e. the segment pair $S_i$ and $S_j$ with the lowest merging cost $\tau_{ij}$) to form a new segment $S_{ij}$ in sub-step 310.

In sub-step 314 the processor 205 identifies all segments $S_l$ adjoining either of the merged segments $S_i$ and $S_j$ and merges any duplicate boundaries, adding their areas. Sub-step 318 follows where the processor 205 calculates a new merging cost $\tau_{ij,l}$ for each boundary between adjacent segments $S_{ij}$ and $S_l$. The new merging costs $\tau_{ij,l}$ effectively reorder the priority queue P.

In sub-step 322 the processor 205 determines whether the merging cost $\tau_{ij}$ at the top of the priority queue P (entry P(1)) has a value greater than the predetermined threshold $\lambda_{stop}$. If the merging cost $\tau_{ij}$ of entry P(1) has a value greater than the predetermined threshold $\lambda_{stop}$, then the processor 205 determines in sub-step 325 whether the known image coordinates $(x_k, v_k)_t$, that corresponds with the positions of the facial features that have to be tracked, are included in a single segment $S_i$. If all three positions of the facial features are in the same segment $S_i$, then the segmentation step 120 ends.

If the conditions of either of sub-step 322 or sub-step 325 are not met, then segment merging must continue, and control is returned to sub-step 310 from where sub-steps 310 to 325 are repeated to merge the segment pair $S_i$ and $S_j$ with the lowest merging cost $\tau_{ij}$.

Figure 4:
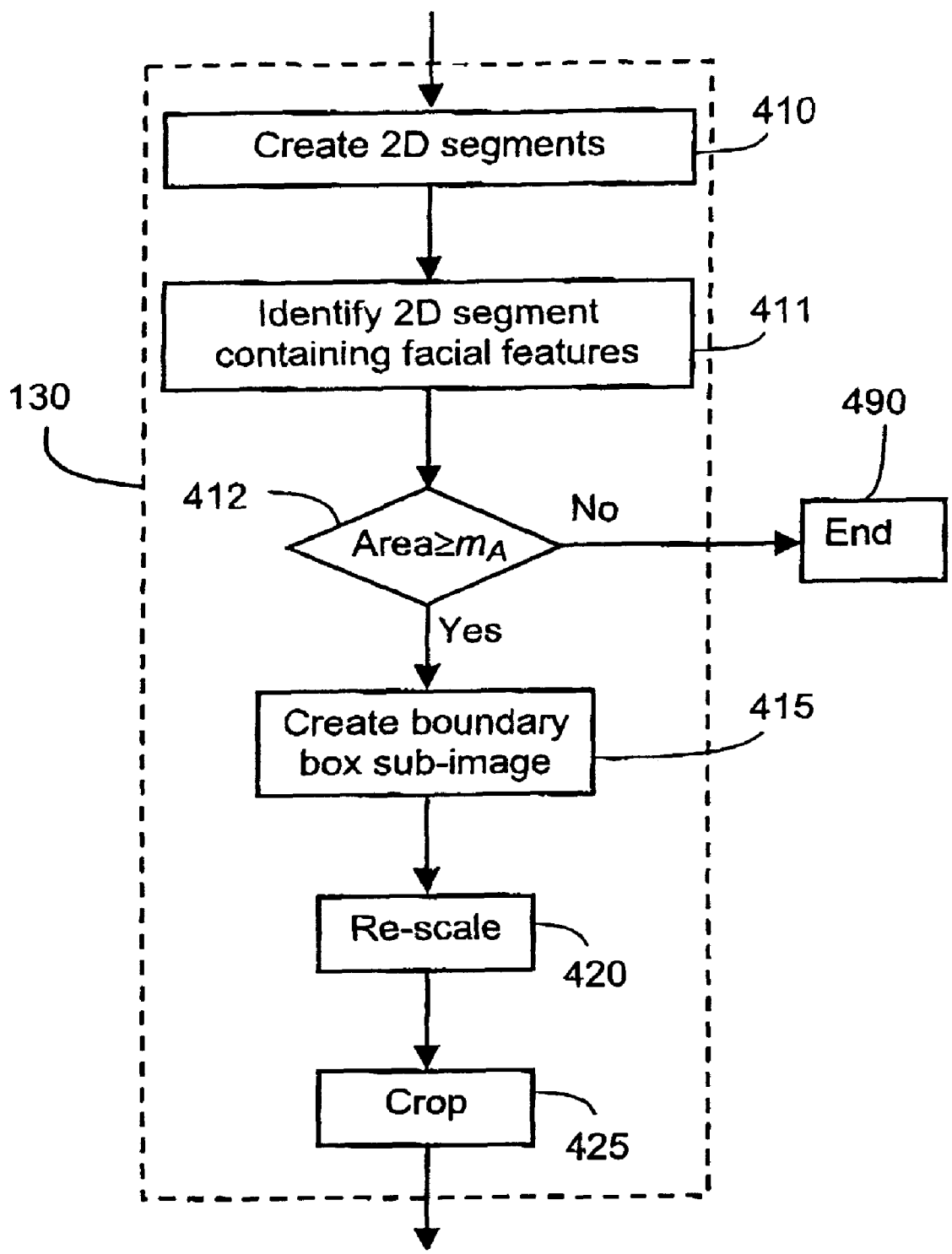
FIG. 4 shows the sub-steps of forming a sub-image, which is performed in the method shown in FIG. 1.

Referring again to FIG. 1, with the set of 3D segments $\{S_i\}$ formed in step 120, and with the image coordinates $(x_k, y_k)_t$ known for the oldest frame t in the block of video data, step 130 follows where the processor 205 forms a sub-image, thereby restricting the search area for identifying candidate facial features. FIG. 4 shows step 130 in more detail.

Step 130 starts in sub-step 410 where the processor 205 "slices through" the 3D segments $S_i$ at frame interval t+1, to produce 2D segments $s_{t+1}{}^i$. Each 2D segment $s_{t+1}{}^i$ incorporates the pixels at frame interval t+1 that are included in the corresponding 3D segment $S_i$.

In sub-step 411 the processor 205 identifies the 2D segment $s_{t+1}{}^i$ containing the facial features, that being the 2D segment $s_{t+1}{}^i$ being associated with the same 3D segment $S_l$ as the 2D segment $s_t{}^i$ in the previous frame containing the known coordinates $(x_k, y_k)_t$ of the facial features being tracked. The first time step 130 is performed, the known coordinates $(x_k, y_k)_t$ will correspond with those received in step 110. In subsequent iterations, the three facial features are those verified as being the facial features in frame t.

Sub-step 412 follows where the processor 205 determines whether the area of the 2D segment $s_{t+1}{}^i$ is equal to or above a minimum area $m_A$. In the preferred implementation the minimum area $m_A$ is 1500 pixels. If the area of segment $s_{t+1}{}^i$ is smaller than the minimum area $m_A$, then features are too small to be tracked and method 100 ends in step 490.

If the area of the 2D segment $s_{t+1}{}^i$ is equal to or above a minimum area $m_A$, then step 130 continues in sub-step 415 where the processor 205 creates a boundary box sub-image $b_{t+1}(x, y)$ from the colour values $\phi(x,y,t+1)$ at frame interval t+1. The boundary box sub-image $b_{t+1}(x, y)$ is a rectangular shaped image formed around the segment $s_{t+1}{}^i$.

The boundary box sub-image $b_{t+1}(x, y)$ is re-scaled in sub-step 420 such that the area of the segment $s_{t+1}{}^i$ in the rescaled boundary box sub-image $b_{t+1}'(x, y)$ is equal to the predefined minimum area $m_A$.

Problems typically associated with displacement in the axis of the camera 250 are overcome by resizing the boundary box sub-image $b_{t+1}(x, y)$ to a fixed size. Furthermore, the resizing also cause the candidate facial features, which are identified in step 140 that follows, to be of similar size inside the re-scaled boundary box sub-image $b_{t+1}'(x, y)$ as those identified in the previous frame, thereby aiding the correspondence between frames.

Sub-step 425 follows where the processor 205 crops the re-scaled boundary box sub-image $b_{t+1}'(x, y)$ to form sub-image $b_{t+1}''(x, y)$. At this point the previous feature coordinates $(x_k, y_k)_t$ are scaled to the size of the sub-image $b_{t+1}''(x, y)$, so that one unit equals one pixel in sub-image $b_{t+1}''(x, y)$. With image coordinates $(x_2, y_2)_t$ corresponding with the position of the right eye then, if the night boundary of the sub-image $b_{t+1}'(x, y)$ is greater than a distance $\Delta v$ from $x_{2t}$, the right bound of sub-image $b_{t+1}''(x, y)$ is set to $(x_{2t}+\Delta v)$, else the right bound of sub-image $b_{t+1}''(x, y)$ remains that of sub-image $b_{t+1}'(x, y)$.

Similarly, with image coordinates $(x_1, y_1)_t$ corresponding with the position of the left eye then, if the left boundary of the sub-image $b_{t+1}'(x, y)$ is greater than the distance $\Delta v$ from $x_{1t}$, the left bound of sub-image $b_{t+1}''(x, y)$ is set to $(x_{1t}-\Delta v)$, else the left bound of sub-image $b_{t+1}''(x, y)$ remains that of sub-image $b_{t+1}'(x, y)$.

If the upper boundary of the sub-image $b_{t+1}'(x, y)$ is greater than the distance $\Delta v$ from the upper one of $y_{1t}$, and $y_{2t}$, then the upper bound of sub-image $b_{t+1}''(x, y)$ is set to $(\max(y_{1t}, y_{2t}) + \Delta v)$, else the upper bound of sub-image $b_{t+1}''(x, y)$ remains that of sub-image $b_{t+1}'(x, y)$.

Finally, with image coordinates $(x_3, y_3)_t$ corresponding with the position of the mouth, if the lower boundary of the sub-image $b_{t+1}'(x, y)$ is greater than the distance $\Delta v$ from $y_{3t}$, then the lower bound of sub-image $b_{t+1}''(x, y)$ is set to $(y_{3t}-\Delta v)$, else the lower bound of sub-image $b_{t+1}''(x, y)$ remains that of sub-image $b_{t+1}'(x, y)$.

In the preferred implementation the distance $\Delta v$ is 5. After cropping, the sub-image $b_{t+1}''(x, y)$ is also stored in memory 206. Sub-image $b_{t+1}''(x, y)$ now defines the search area for identifying candidate facial features in step 140 that follows step 130. At this point, the (scaled) previous feature coordinates $(x_k, y_k)_t$ are referred to a new origin, namely the centroid of the current face segment $s_{t+1}{}^i$. All subsequent coordinates are with respect to this origin, unless otherwise stated. Accordingly, method 100 (FIG. 1) continues to step 140 where the processor 205 identifies candidate facial features, and extracts information from each of the candidate facial features in sub-image $b_{t+1}''(x, y)$.

Figure 5:
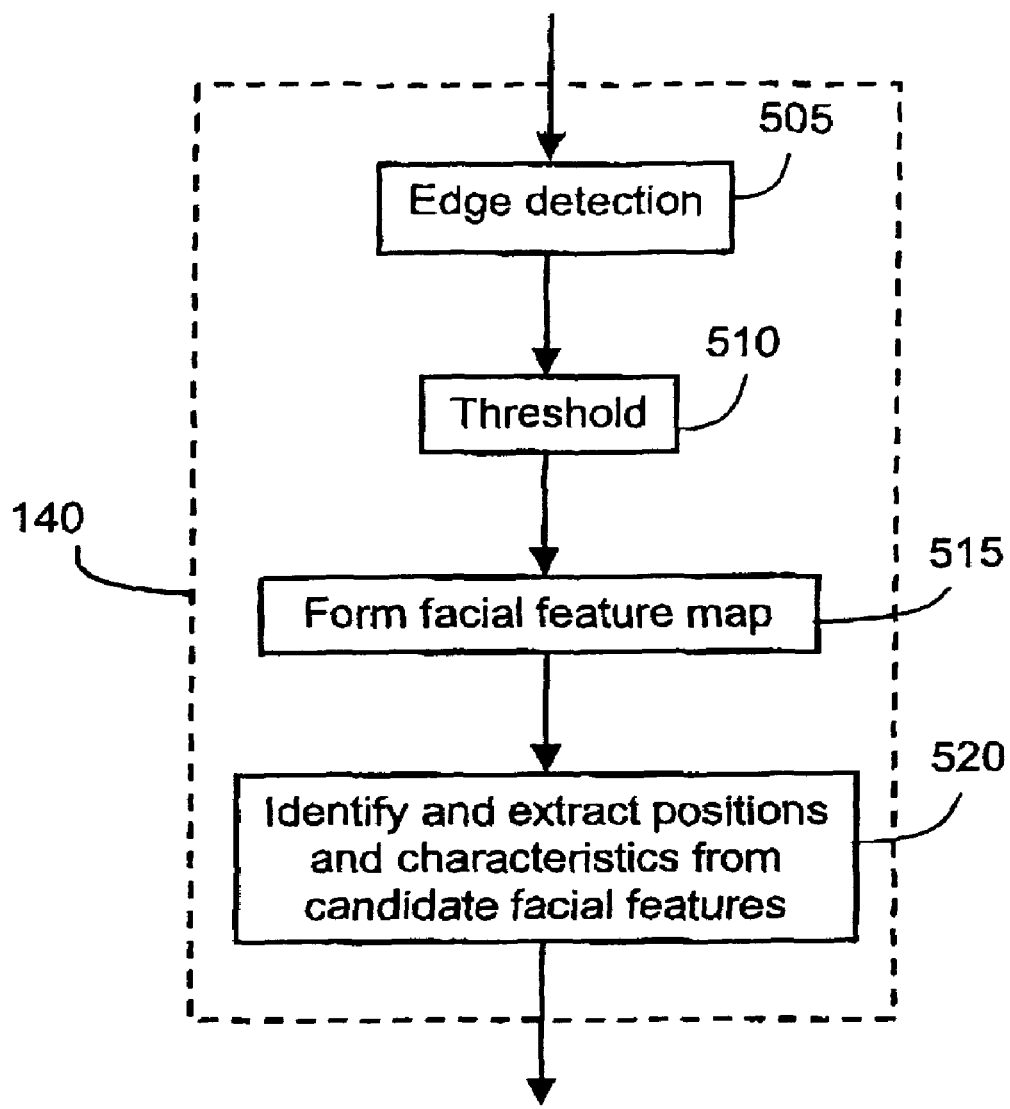
FIG. 5 shows the sub-steps of identifying candidate facial features, which is also performed in the method shown in FIG. 1.

FIG. 5 shows a flow diagram of the sub-steps of step 140. A first part of step 140 extracts a facial feature map $b_{t+1}'''(x, y)$ from the sub-image $b_{t+1}''(x, y)$. The facial feature map $b_{t+1}'''(x, y)$ is a binary image, with the value of its pixels set to "1" when those pixels are found to be part of a candidate facial feature and set to "0" otherwise. A second part of step 140 then extracts information from each of the candidate facial features, that information including the positions of the candidate facial features inside the facial feature map $b_{t+1}'''(x, y)$, and shape characteristics of the candidate facial features.

The extraction of a facial feature map $b_{t+1}'''(x, y)$ from the sub-image $b_{t+1}''(x, y)$ is based on two characteristics of facial features. A first is that such features give small edges after edge detection, and a second is that they are darker than the rest of the face. Using these characteristics, two initial facial feature maps $f_1(x, y)$ and $f_2(x, y)$ are formed from the sub-image $b_{t+1}''(x, y)$, from which the facial feature map $b_{t+1}'''(x, y)$ is then formed.

Step 140 Starts in sub-step 505 where the processor 205 forms a first initial facial feature map $f_1(x, y)$ by applying an edge detection algorithm to the sub-image $b_{t+1}''(x, y)$. Any edge detection technique may be used, but in the preferred implementation the Laplacian edge detection technique is used. A mask $\Gamma$ is first applied to sub-image $b_{t+1}''(x, y)$ to form a gradient map, followed by applying a threshold to the gradient map. In the preferred implementation the mask $\Gamma$ is:

$$\Gamma = \begin{bmatrix} 0.0276655 \\ -0.224751 \\ 1.65895 \\ -2.92373 \\ 1.65895 \\ -0.224751 \\ 0.0276655 \end{bmatrix} \quad (13)$$

and the threshold is set such that 15% of pixels in the initial first facial feature map $f_1(x, y)$ are set to "1", those pixels corresponding to the pixels in the gradient map having the highest gradient.

The second initial facial feature map $f_2(x, y)$ is formed by applying a threshold in sub-step 510 to sub-image $b_{t+1}''(x, y)$, giving a value of "1" to pixels with intensity values lower than a predetermined value and a value of "0" to pixels with intensity values above the predetermined value. Again, the threshold is set such that 15% of pixels in the second initial facial feature map $f_2(x, y)$ are set to "1".

The facial feature map $b_{t+1}'''(x, y)$ is then formed by the processor 205 in sub-step 515 by taking the result of applying an "AND" function on the two initial facial feature maps $f_1(x, y)$ and $f_2(x, y)$. Hence, if corresponding pixels in the two initial facial feature maps $f_1(x, y)$ and $f_2(x, y)$ both have the value "1", then that pixel has the value "1" in the facial feature map $b_{t+1}'''(x, y)$.

The processor 205 next, in sub-step 520, identifies candidate facial features and then extracts the position and characteristics of each identified candidate facial feature. A candidate facial feature is identified as a cluster of pixels in the facial feature map $b_{t+1}'''(x, y)$ having values of "1". If the shape of the 2D segment $s_{t+1}{}^i$ identified as containing the face does not change drastically, the position $(x_i, y_i)'$ of each facial feature should be independent of the position of the face in the frame. The characteristics of the candidate facial feature include its area $A'_i$, which is the number of pixels in the cluster, and the eccentricity $\epsilon'_i$ of the candidate facial feature, which is the ratio of the width against the height of the candidate facial feature.

Referring again to FIG. 1, with candidate facial features identified and information extracted, the processor 205 identifies in step 150 which of the candidate facial features possibly correspond with the facial features for tracking identified in step 110, and in particular, the facial features verified in a previous frame as corresponding with the facial features for tracking identified in step 110. In order to identify whether the i-th candidate facial feature possibly corresponds with the facial features for tracking, the processor 205 calculates the Euclidean distance $d_{ij}$ between the i-th candidate facial feature in frame t+1, and the j-th facial feature in frame t as follows:

$$d_{ij} = \sqrt{(x_i' - x_j)^2 + (y_i' - y_j)^2} \quad (14)$$

If the Euclidean distance $d_{ij}$ between the i-th candidate facial feature in frame t+1, and the j-th facial feature in frame t is below a threshold, then a characteristic similarity measure is calculated using the respective areas $A'_i$ and $A_j$, and eccentricities $\epsilon'_i$ and $\epsilon_j$:

$$D_{ij} = (A_i' - A_j)^2 + (\epsilon_i' - \epsilon_j)^2 \quad (15)$$

If the characteristic similarity measure $D_{ij}$ is also below a threshold, then the i-th candidate facial feature has a possible correspondence with the j-th facial feature, and an entry i is added to a list $L_j$. After processing all of the candidate facial features in this manner, the list $L_j$ contains the identifier of each of the candidate facial features that may possibly correspond to the j-th facial feature in the previous frame.

An empty list $L_j$ means that no candidate facial feature corresponding to the j-th facial feature in the previous frame has been identified. Two events may cause list $L_j$ to be empty. Firstly, it may be that the j-th facial feature was not detected in the previous frame. In this event the Euclidean distance $d_{ij}$ would be higher than the threshold, and an attempt is made in step 155 that follows to recover such a facial feature in case it reappeared. The second event that may cause list $L_j$ to be empty is when the j-th facial feature was detected in the previous frame, but then disappeared in the current frame.

Method 100 (FIG. 1) now proceeds to step 155 where the processor assigns one of the possible candidate facial features to the j-th facial feature, and attempts to recover facial features where appropriate. Let the lists $L_1$, $L_2$ and $L_3$ relate to the left eye, right eye and mouth respectively. A total of 8 possible scenarios may arise, which are:

1: Lists $L_1$, $L_2$ and $L_3$ are empty, which means that no corresponding candidate facial features were identified;

2: Lists $L_2$ and $L_3$ are empty, which means that the left eye has a corresponding candidate facial feature;

3: Lists $L_1$ and $L_3$ are empty, which means that the right eye has a corresponding candidate facial feature;

4: Lists $L_1$ and $L_2$ are empty, which means that the mouth has a corresponding candidate facial feature;

5: List $L_2$ is empty, which means that the left eye and the mouth have corresponding candidate facial features;

6: List $L_1$ is empty, which means that the right eye and the mouth have corresponding candidate facial features;

7: List $L_3$ is empty, which means the eyes have corresponding candidate facial features; and 8: Lists $L_1$, $L_2$ and $L_3$ have entries, which means that both eyes and the mouth have corresponding candidate facial features.

In the case when scenario 1 exists, no corresponding facial features were identified and the method 100 terminates as the features being tracked have been lost.

Figure 6A:
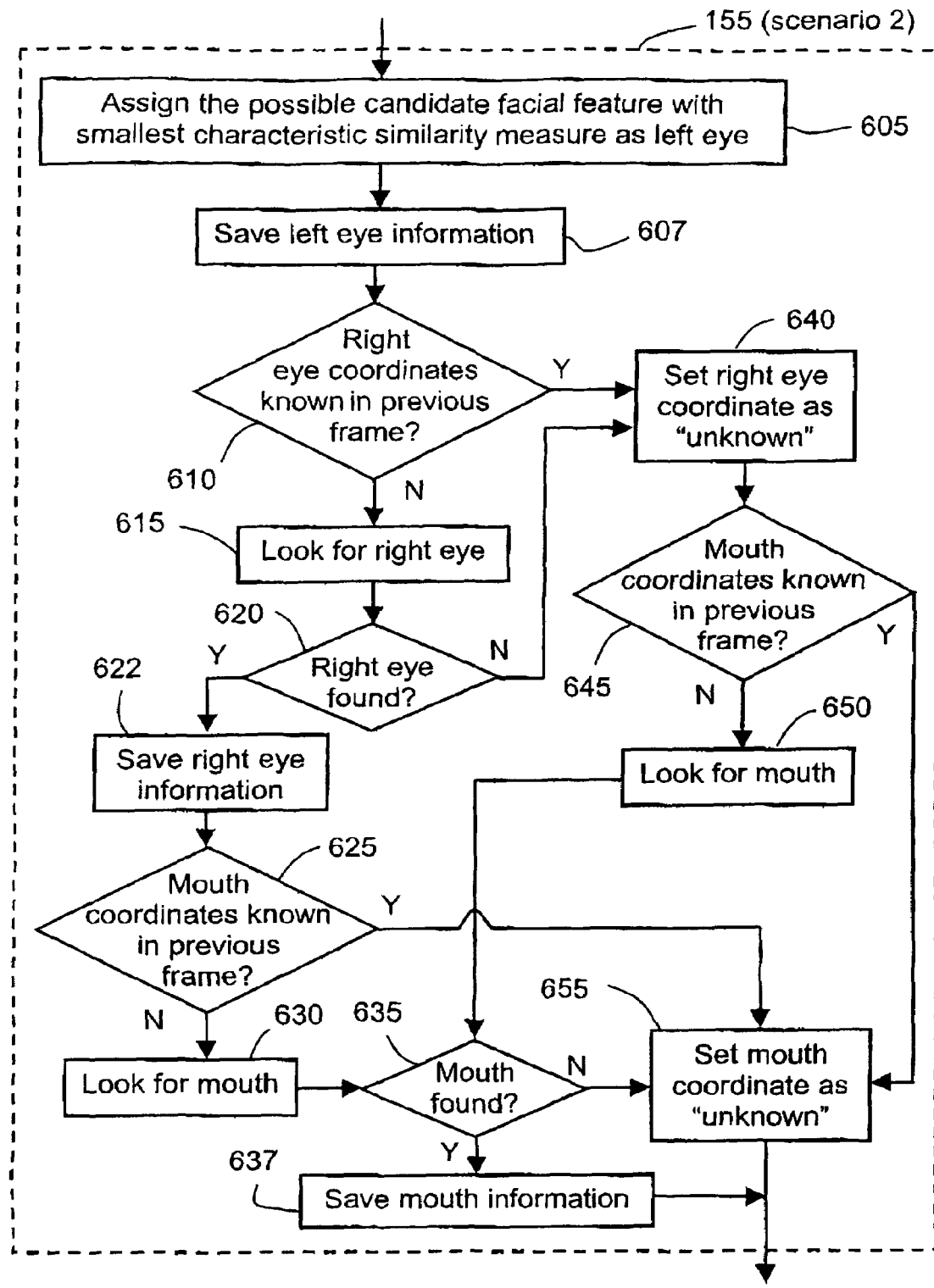
FIGS. 6A to 6G show flow diagrams of the sub-steps of assigning possible candidate facial features to facial features.

In the case when scenario 2 exists, the left eye has at least one corresponding candidate facial feature. FIG. 6A shows a flow diagram of the sub-steps of step 155 in the case when scenario 2 exists. Step 155 starts in sub-step 605 where the possible candidate facial feature in list $L_1$ with the smallest characteristic similarity measure $D_{i1}$ is assigned as corresponding to the left eye. In sub-step 607 the processor 205 then saves the position $(x_i, y_i)'$ of the left eye as coordinates $(x_1, y_1)_{t+1}$, together with its area $A'_i$ as area $A_1$ and its eccentricity $\epsilon'_1$ as eccentricity $\epsilon_1$.

The processor 205 then determines in sub-step 610 whether the coordinates $(x_2, y_2)_t$ of the right eye were known in the previous frame. If the coordinates $(x_2, y_2)_t$ of the right eye were not known, then the right eye was not detected in the previous frame, but may have reappeared in the current frame Accordingly, sub-step 615 attempts to recover the right eye by determining whether any candidate facial features have coordinates $(x_i, y_i)'$ satisfying the following conditions, starting with the candidate facial feature with the lowest characteristic similarity measure $D_{ij}$:

$$-3<(y_i'-y_{1(t+1)})<3 \text{ AND } 5<(x_i'-x_{1(t+1)})<11 \tag{16}$$

The processor 205 then determines in sub-step 620 whether a facial feature corresponding to the right eye was found in sub-step 615. If a facial feature corresponding to the right eye was found then, in sub-step 622 the processor 205 saves the position $(x_i, y_i)'$ of the candidate facial feature corresponding to the right eye as coordinates $(x_2, y_2)_{t+1}$, together with its area $A'_i$ as area $A_2$ and its eccentricity $\epsilon'_i$ as eccentricity $\epsilon_2$.

The processor 205 determines in sub-step 625 whether the coordinates $(x_3, y_3)_t$ of the mouth were known in the previous frame. If the coordinates $(x_3, y_3)_t$ of the mouth were not known, then the mouth was not detected in the previous frame, but may have reappeared in the current frame. Accordingly, sub-step 630 attempts to recover the mouth by creating a triangle defined by the coordinates of the two eyes $(x_1, y_1)_{t+1}$ and $(x_2, y_2)_{t+1}$, and any of the candidate features $(x_i, y_i)'$, starting with the candidate facial feature with the lowest characteristic similarity measure $D_{ij}$.

Let $\alpha_1$ and $\alpha_2$ be the angles in radians of the triangle at the left eye and the right eye respectively. Also, let $\delta$ be the distance from the centre of the eye-eye line to the candidate facial feature under consideration. If the following conditions are met:

$$(0.9<\alpha_1<1.45) \text{ AND } (0.9<\alpha_2 21\ 1.45) \text{ AND } (10<\delta<15) \tag{17}$$

then the candidate facial feature under consideration corresponds with the mouth.

If it is determined in sub-step 610 that the coordinates $(x_2, y_2)_t$ of the right eye were known in the previous frame, or if it is determined in sub-step 620 that a facial feature corresponding to the right eye was not found, then the night eye disappeared in the current frame. Step 155 proceeds to sub-step 640 where the processor 205 sets the coordinates $(x_2, y_2)_{t+1}$ to "unknown". The processor 205 then determines in sub-step 645 whether the coordinates $(x_3, y_3)_t$ of the mouth were known in the previous frame. If the coordinates $(x_3, y_3)_t$ of the mouth were not known, then the mouth was not detected in the previous frame, but may have reappeared in the current frame. Accordingly, sub-step 650 attempts to recover the mouth by determining whether any candidate facial features have coordinates $(x_i, y_i)'$ satisfying the following conditions, starting again with the candidate facial feature with the lowest characteristic similarity measure $D_{ij}$:

$$-7<(x_{1(t+1)}-x_i')<-2 \text{ AND } 7<(y_{1(t+1)}-y_i')<14 \tag{18}$$

Following sub-step 630 or 650, the processor 205 then determines in sub-step 635 whether a facial feature corresponding to the mouth was found in sub-step 630 or 650. If a facial feature corresponding to the mouth was found then, in sub-step 637 the processor 205 saves the position $(x_i, y_i)'$ of the candidate facial feature corresponding to the mouth as coordinates $(x_3, y_3)_{t+1}$, together with its area $A'_i$, as area $A_j$ and its eccentricity $\epsilon'_i$ as eccentricity $\epsilon_3$. Step 155 also ends.

If it is determined in either of sub-step 625 or 645 that the coordinates $(x_3, y_3)_t$ of the mouth were known in the previous frame, then the mouth disappeared in the current frame and the processor 205 sets the coordinates $(x_3, y_3)_{t+1}$ to "unknown" in sub-step 655 before step 155 ends.

Figure 6B:
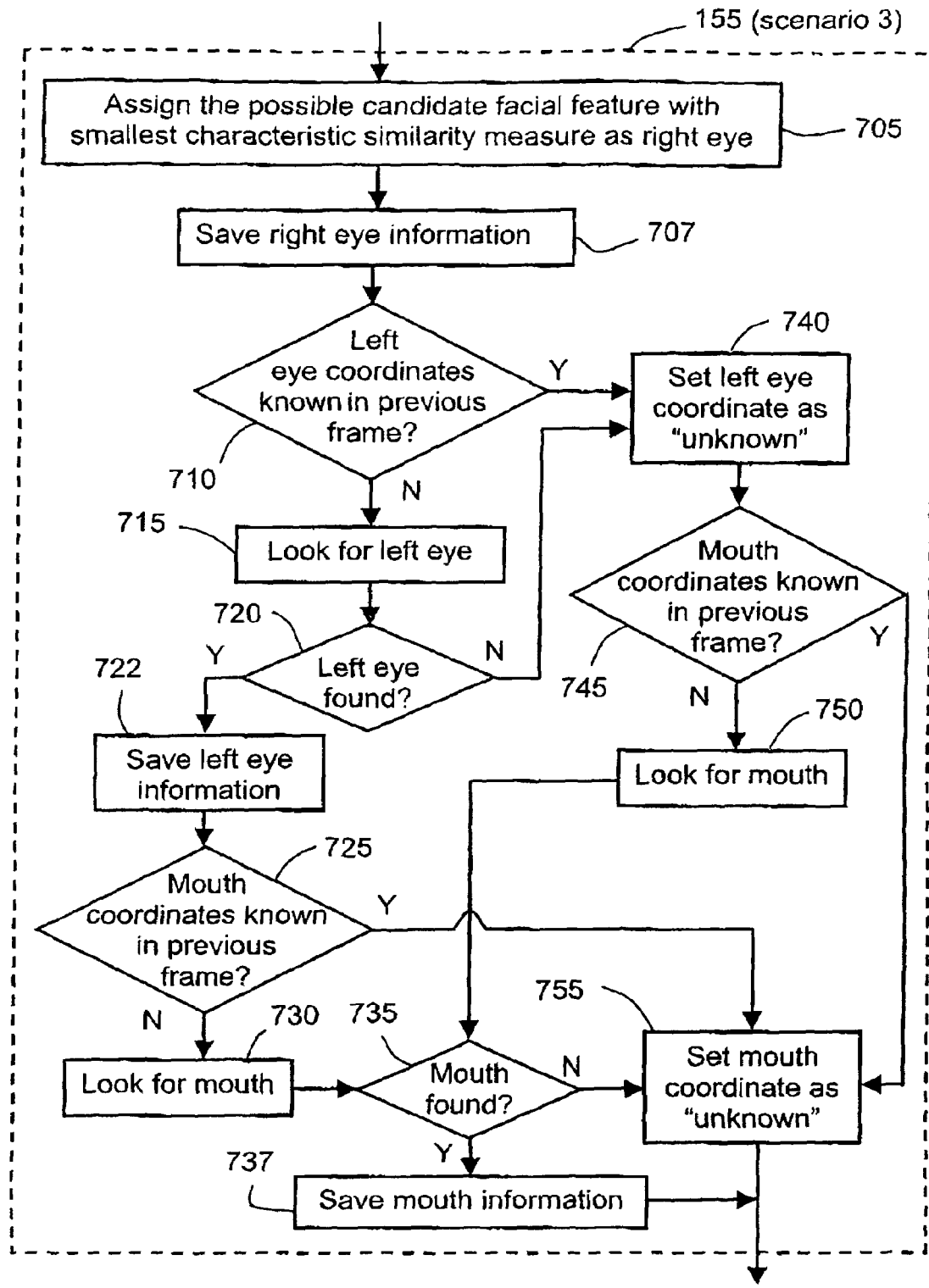

In the case when scenario 3 exists, the right eye has at least one corresponding candidate facial feature. FIG. 6B shows a flow diagram of the sub-steps of step 155 in the case when scenario 2 exists. Step 155 starts in sub-step 705 where the possible candidate facial feature in list $L_2$ with the smallest characteristic similarity measure $D_{i2}$ is assigned as corresponding to the right eye. In sub-step 707 the processor 205 then saves the position $(x_i, y_i)'$ of the right eye as coordinates $(x_2, y_2)_{t+1}$, together with its area $A'_i$ as area. $A_2$ and its eccentricity $\epsilon'_1$ as eccentricity $\epsilon_2$.

The processor 205 then determines in sub-step 710 whether the coordinates $(x_1, y_1)_t$ of the left eye were known in the previous frame. If the coordinates $(x_1, y_1)_t$ of the left eye were not known, then the left eye was not detected in the previous frame, but may have reappeared in the current frame. Accordingly, sub-step 715 attempts to recover the left eye by determining whether any candidate facial features have coordinates $(x_i, y_i)'$ satisfying the following conditions, starting with the candidate facial feature with the lowest characteristic similarity measure $D_{ij}$:

$$-3<(y_i'-y_{2(t+1)})<3 \text{ AND } -11<(x_i'-x_{2(t+1)})<-5 \tag{19}$$

The processor 205 then determines in sub-step 720 whether a facial feature corresponding to the left eye was found in sub-step 715. If a facial feature corresponding to the left eye was found then, in sub-step 722 the processor 205 saves the position $(x_i, y_i)'$ of the candidate facial feature corresponding to the left eye as coordinates $(x_1, y_1)_{t+1}$, together with its area $A'_i$ as area $A_1$ and its eccentricity $\epsilon'_i$ as eccentricity $\epsilon_1$.

The processor 205 determines in sub-step 725 whether the coordinates $(x_3, y_3)_t$ of the mouth were known in the previous frame. If the coordinates $(x_3, y_3)_t$ of the mouth were not known, then the mouth was not detected in the previous frame, but may have reappeared in the current frame. Accordingly, sub-step 730 attempts to recover the mouth by creating a triangle defined by the coordinates of the two eyes $(x_1, y_1)_{t+1}$ and $(x_2, y_2)_{t+1}$, and any of the candidate features $(x_i, y_i)'$, starting with the candidate facial feature with the lowest characteristic similarity measure $D_{ij}$. If the conditions of Equation (17) are met, then the candidate facial feature under consideration corresponds with the mouth.

If it is determined in sub-step 710 that the coordinates $(x_1, y_1)_t$ of the left eye were known in the previous frame, or if it is determined in sub-step 720 that a facial feature corresponding to the left eye was not found, then the left eye disappeared in the current frame. Step 155 proceeds to sub-step 740 where the processor 205 sets the coordinates $(x_1, y_1)_{t+1}$ to "unknown". The processor 205 then determines in sub-step 745 whether the coordinates $(x_3, y_3)_t$ of the mouth were known in the previous frame. If the coordinates $(x_3, y_3)_t$ of the mouth were not known, then the mouth was not detected in the previous frame, but may have reappeared in the current frame. Accordingly, sub-step 750 attempts to recover the mouth by determining whether any candidate facial features have coordinates $(x_i, y_i)'$ satisfying the following conditions, starting again with the candidate facial feature with the lowest characteristic similarity measure $D_{ij}$:

$$2<(x_{2(t+1)}-x_i')<7 \text{ AND } 7<(y_{2(t+1)}-y_i')<14 \qquad (20)$$

Following sub-step 730 or 750, the processor 205 then determines in sub-step 735 whether a facial feature corresponding to the mouth was found in sub-step 730 or 750. If a facial feature corresponding to the mouth was found then, in sub-step 737 the processor 205 saves the position $(x_i, y_i)'$ of the candidate facial feature corresponding to the mouth as coordinates $(x_3, y_3)_{t+1}$, together with its area $A'_i$ as area $A_3$ and its eccentricity $\epsilon'_i$ as eccentricity $\epsilon_3$. Step 155 also ends.

If it is determined in either of sub-step 725 or 745 that the coordinates $(x_3, y_3)_t$ of the mouth were known in the previous frame, then the mouth disappeared in the current frame and the processor 205 sets the coordinates $(x_3, y_3)_{t+1}$ to "unknown" in sub-step 755 before step 155 ends.

Figure 6C:
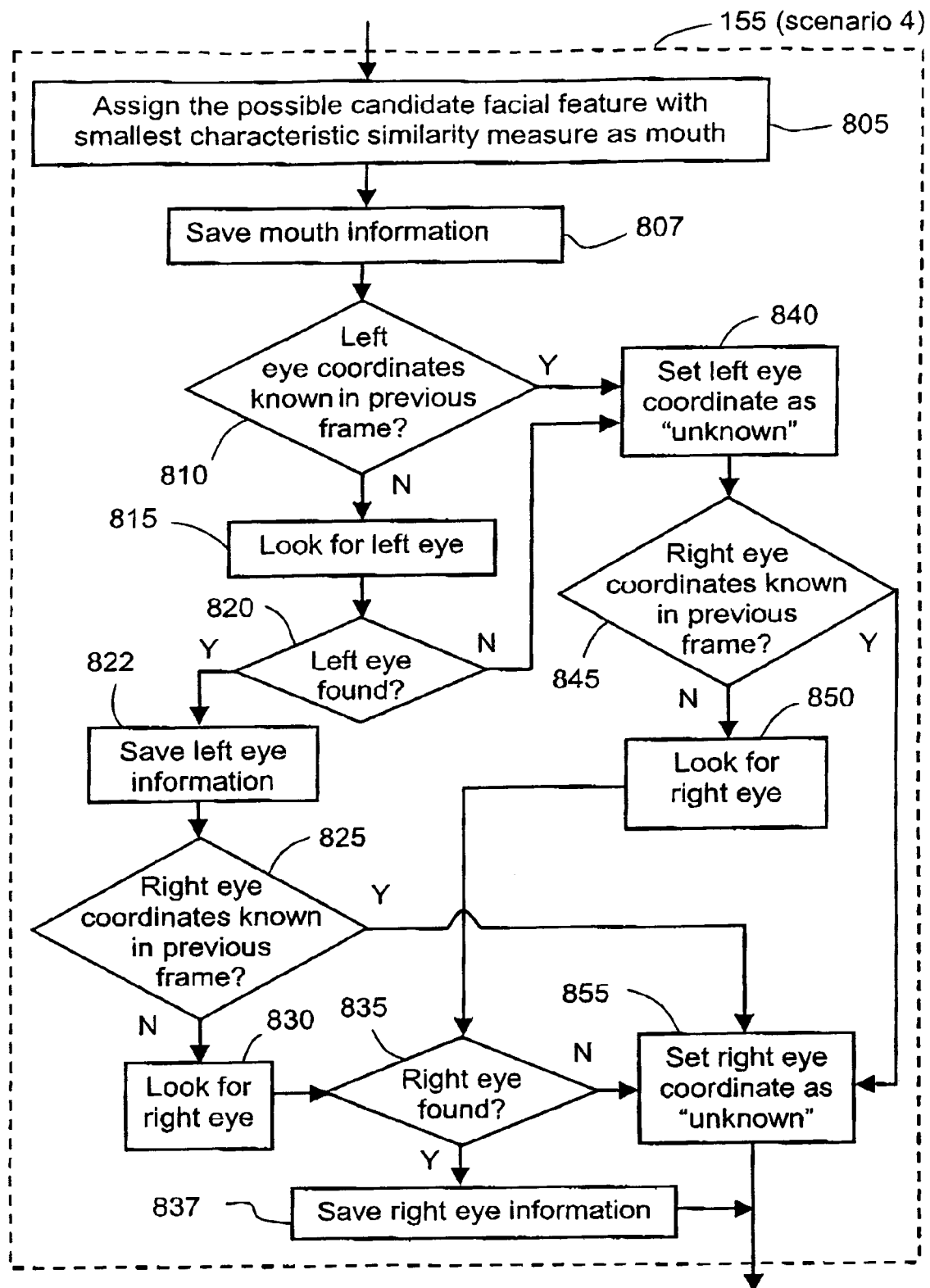

In the case when scenario 4 exists, the mouth has at least one corresponding candidate facial feature. FIG. 6C shows a flow diagram of the sub-steps of step 155 in the case when scenario 4 exists. Step 155 starts in sub-step 805 where the possible candidate facial feature in list $L_3$ with the smallest characteristic similarity measure $D_{i3}$ is assigned as corresponding to the mouth. In sub-step 807 the processor 205 then saves the position $(x_i, y_i)'$ of the mouth as coordinates $(x_3, y_3)_{t+1}$, together with its area $A'_i$ as area $A_3$ and its eccentricity $\epsilon'_i$ as eccentricity $\epsilon_3$.

The processor 205 then determines in sub-step 810 whether the coordinates $(x_1, y_1)_t$ of the left eye were known in the previous frame. If the coordinates $(x_1, y_1)_t$ of the left eye were not known, then the left eye was not detected in the previous frame, but may have reappeared in the current frame. Accordingly, sub-step 815 attempts to recover the left eye by determining whether any candidate facial features have coordinates $(x_i, y_i)'$ satisfying the following conditions, starting with the candidate facial feature with the lowest characteristic similarity measure $D_{ij}$:

$$7<(y_i'-y_{3(t+1)})<14 \text{ AND } -7<(x_i'-x_{3(t+1)})<-2 \qquad (21)$$

The processor 205 then determines in sub-step 820 whether a facial feature corresponding to the left eye was found in sub-step 815. If a facial feature corresponding to the left eye was found then, in sub-step 822 the processor 205 saves the position $(x_i, y_i)'$ of the candidate facial feature corresponding to the left eye as coordinates $(x_1, y_1)_{t+1}$, together with its area $A'_i$ as area $A_1$ and its eccentricity $\epsilon'_i$ as eccentricity $\epsilon_1$.

The processor 205 determines in sub-step 825 whether the coordinates $(x_2, y_2)_t$ of the right eye were known in the previous frame. If the coordinates $(x_2, y_2)_t$ of the right eye were not known, then the right eye was not detected in the previous frame, but may have reappeared in the current frame. Accordingly, sub-step 830 attempts to recover the right eye by creating a triangle defined by the coordinates of the left eye $(x_1, y_1)_{t+1}$, the mouth $(x_3, y_3)_{t+1}$, and any of the candidate features $(x_i, y_i)'$, starting with the candidate facial feature with the lowest characteristic similarity measure $D_{ij}$. If the conditions of Equation (17) are met, then the candidate facial feature under consideration corresponds with the right eye.

If it is determined in sub-step 810 that the coordinates $(x_1, y_1)_t$ of the left eye were known in the previous frame, or if it is determined in sub-step 820 that a facial feature corresponding to the left eye was not found, then the left eye disappeared in the current frame. Step 155 proceeds to sub-step 840 where the processor 205 sets the coordinates $(x_1, y_1)_{t+1}$ to "unknown". The processor 205 then determines in sub-step 845 whether the coordinates $(x_2, y_2)_t$ of the right eye were known in the previous frame. If the coordinates $(x_2, y_2)_t$ of the right eye were not known, then the right eye was not detected in the previous frame, but may have reappeared in the current frame. Accordingly, sub-step 850 attempts to recover the right eye by determining whether any candidate facial features have coordinates $(x_i, y_i)'$ satisfying the following conditions, starting with the candidate facial feature with the lowest characteristic similarity measure $D_{ij}$:

$$2<(x_{2(t-1)}-x_i')<7 \text{ AND } 7<(y_i'-y_{3(t+1)})<14 \qquad (22)$$

Following sub-step 830 or 850, the processor 205 then determines in sub-step 835 whether a facial feature corresponding to the right eye was found in sub-step 830 or 850. If a facial feature corresponding to the right eye was found then, in sub-step 837 the processor 205 saves the position $(x_i, y_i)'$ of the candidate facial feature corresponding to the right as coordinates $(x_2, y_2)_{t+1}$, together with its area $A'_i$ as area $A_2$ and its eccentricity $\epsilon'_i$ as eccentricity $\epsilon_2$. Step 155 also ends.

If it is determined in either of sub-step 825 or 845 that the coordinates $(x_2, y_2)_t$ of the right eye were known in the previous frame, then the right eye disappeared in the current frame and the processor 205 sets the coordinates $(x_2, y_2)_{t+1}$ to "unknown" in sub-step 855 before step 155 ends.

Figure 6D:
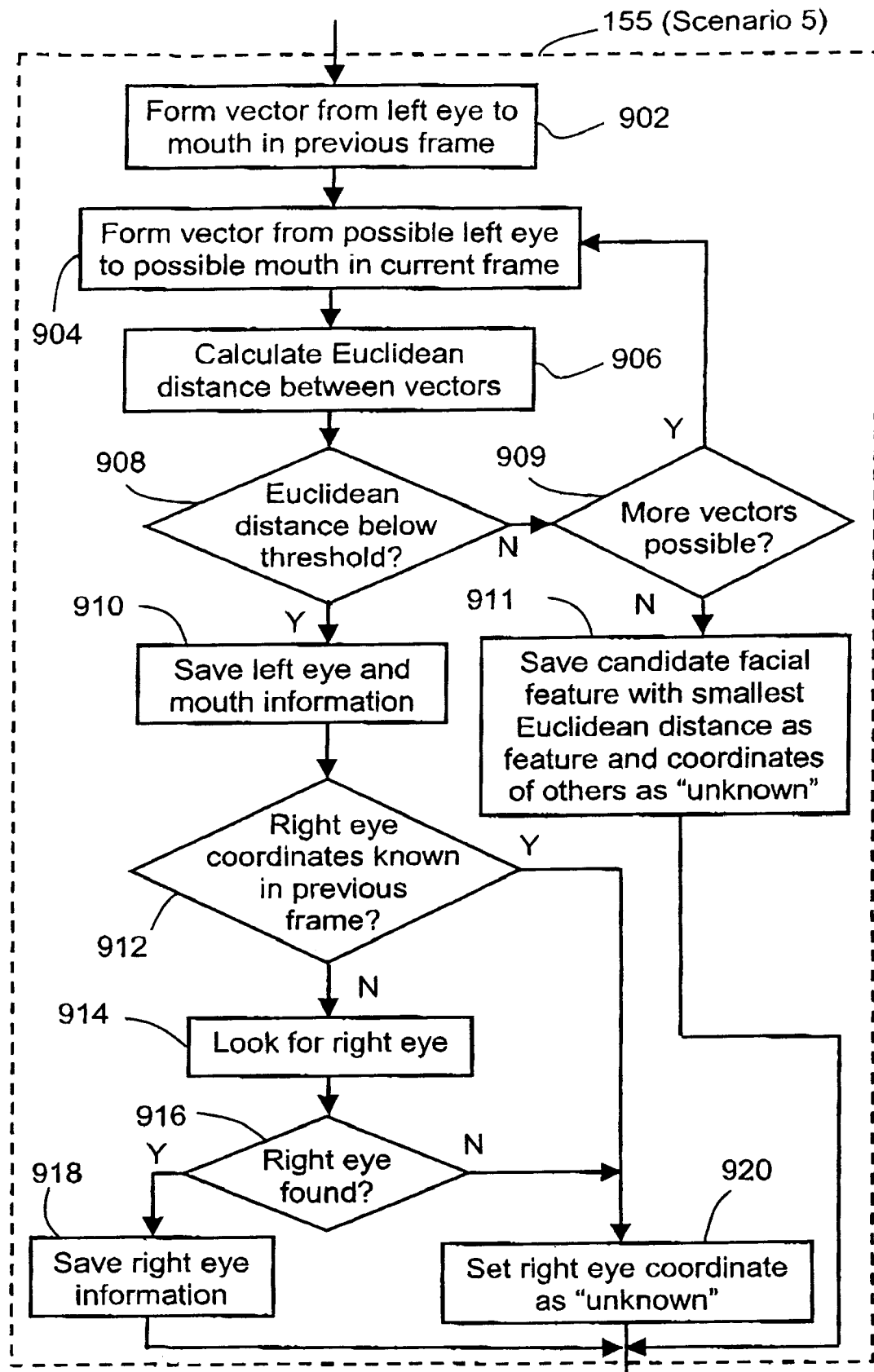

In the case when scenario 5 exists, the left eye and the mouth have at least one corresponding candidate facial feature. FIG. 6D shows a flow diagram of the sub-steps of step 155 in the case when scenario 5 exists. Step 155 then starts in sub-step 902 where the processor 205 forms a vector $(x_3-x_1, y_3-y_1)_t$ from the left eye to the mouth in the previous frame. A vector is also formed in sub-step 904 from a possible candidate facial feature in list $L_1$ to a possible candidate facial feature in list $L_3$.

The processor 205 then calculates in sub-step 908 the Euclidean distance between the vectors formed in sub-steps 902 and 904 respectively. The processor 205 then determines in sub-step 908 whether the Euclidean distance is below a threshold. If the Euclidean distance is not below the threshold, then processor 205 determines in sub-step 909 whether another vector can be formed in sub-step 904 with a different combination of possible candidate facial features in lists $L_1$ and $L_3$. If another vector can be formed, then control is passed to sub-step 904 from where sub-steps 904 to 908 are repeated.

If another vector can not be formed with a different combination of possible candidate facial features in lists $L_1$ and $L_3$ then, in sub-step 911, the possible candidate facial feature in lists $L_1$ and $L_3$ with the smallest Euclidean distance $d_{i1}$ or $d_{i3}$ (calculated in step 150) is assigned as corresponding to the corresponding feature by saving its information, while the coordinates of the other two features are set to "unknown". Step 155 then ends.

If the processor 205 determines in sub-step 908 that the Euclidean distance is below the threshold, then processor 205 saves the information of the two possible candidate facial features forming the vector as the left eye and mouth respectively.

The processor 205 then determines in sub-step 912 whether the coordinates $(x_2, y_2)_t$ of the right eye were known in the previous frame. If the coordinates $(x_2, y_2)_t$ of the right eye were not known, then the right eye was not detected in the previous frame, but may have reappeared in the current frame. Accordingly, sub-step 914 attempts to recover the right eye by creating a triangle defined by the coordinates of the left eye $(x_1, y_1)_{t+1}$, the mouth $(x_3, y_3)_{t+1}$, and any of the candidate features $(x_i, y_i)'$, starting with the candidate facial feature with the lowest characteristic similarity measure $D_{ij}$. If the conditions of Equation (17) are met, then the candidate facial feature under consideration corresponds with the right eye.

The processor 205 then determines in sub-step 916 whether a facial feature corresponding to the right eye was found in sub-step 914. If a facial feature corresponding to the right eye was found then, in sub-step 918 the processor 205 saves the position $(x_i, y_i)'$ of the candidate facial feature corresponding to the right eye as coordinates $(x_2, y_2)_{t+1}$, together with its area $A'_i$ as area $A_2$ and its eccentricity $\epsilon'_1$ as eccentricity $\epsilon_2$. Step 155 also ends.

If it is determined in sub-step 912 that the coordinates $(x_2, y_2)_t$ of the right eye were known in the previous frame, or if it is determined in sub-step 916 that a facial feature corresponding to the right eye was not found, then the right eye disappeared in the current frame. Step 155 proceeds to sub-step 920 where the processor 205 sets the coordinates $(x_2, y_2)_{t+1}$ to "unknown". Step 155 also ends after sub-step 920.

Figure 6E:
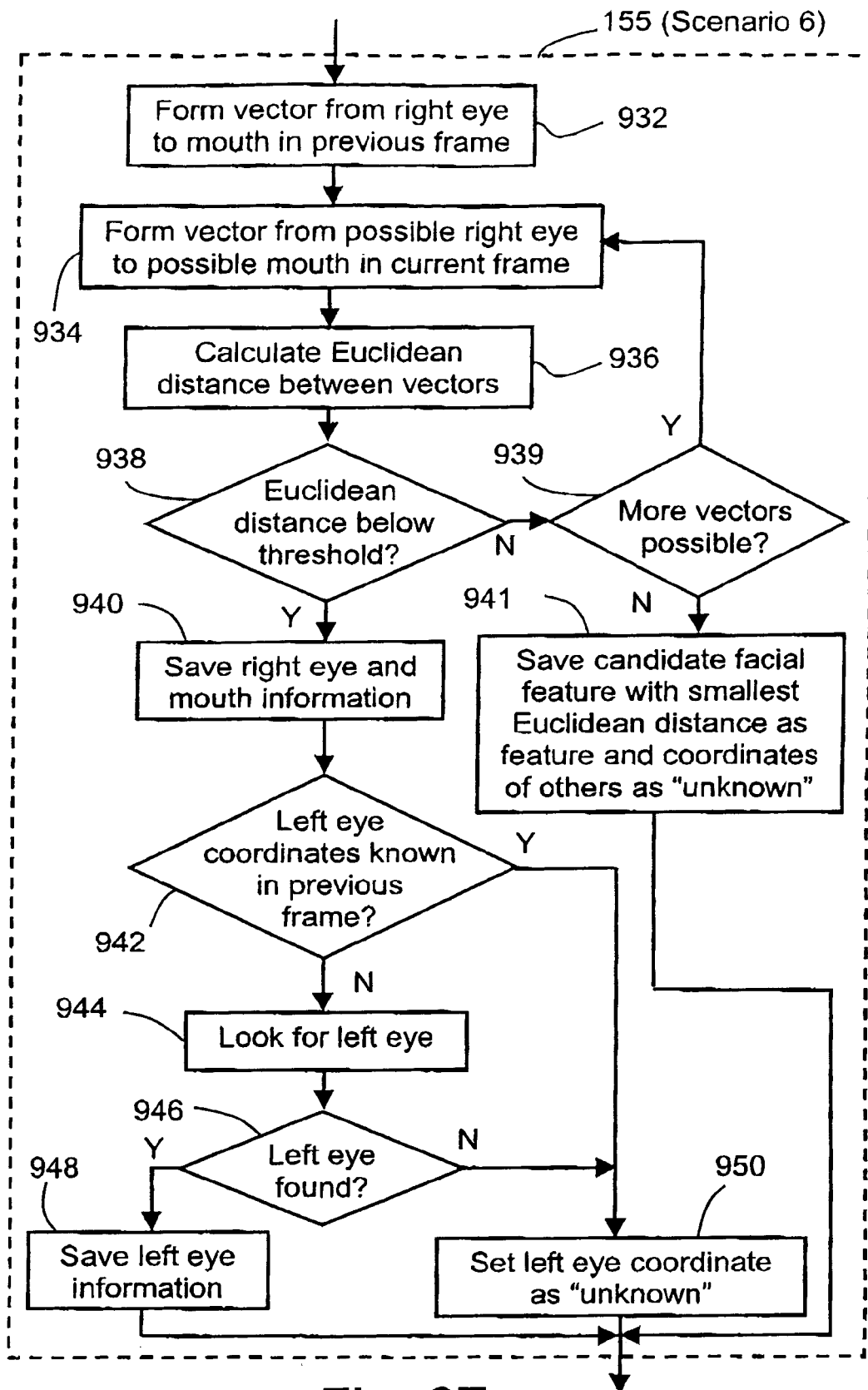

In the case when scenario 6 exists, the right eye and the mouth have at least one corresponding candidate facial feature. FIG. 6E shows a flow diagram of the sub-steps of step 155 in the case when scenario 6 exists. Step 155 then starts in sub-step 932 where the processor 205 forms a vector $(x_3-x_2, y_3-y_2)_t$ from the right eye to the mouth in the previous frame. A vector is also formed in sub-step 934 from a possible candidate facial feature in list $L_2$ to a possible candidate facial feature in list $L_3$.

The processor 205 then calculates in sub-step 938 the Euclidean distance between the vectors formed in sub-steps 932 and 934 respectively. The processor 205 then determines in sub-step 938 whether the Euclidean distance is below a threshold. If the Euclidean distance is not below the threshold, then processor 205 determines in sub-step 939 whether another vector can be formed in sub-step 934 with a different combination of possible candidate facial features in lists $L_2$ and $L_3$. If another vector can be formed, then control is passed to sub-step 934 from where sub-steps 934 to 938 are repeated.

If another vector can not be formed with a different combination of possible candidate facial features in lists $L_2$ and $L_3$ then, in sub-step 941, the possible candidate facial feature in lists $L_2$ and $L_3$ with the smallest Euclidean distance $d_{i2}$ or $d_{i3}$ (calculated in step 150) is assigned as corresponding to the corresponding feature by saving its information, while the coordinates of the other two features are set to "unknown" Step 155 then ends.

If the processor 205 determines in sub-step 938 that the Euclidean distance is below the threshold, then processor 205 saves the information of the two possible candidate facial feature forming the vector as the right eye and mouth respectively.

The processor 205 then determines in sub-step 942 whether the coordinates $(x_1, y_1)_t$ of the left eye were known in the previous frame. If the coordinates $(x_1, y_1)_t$ of the left eye were not known, then the left eye was not detected in the previous frame, but may have reappeared in the current frame. Accordingly, sub-step 944 attempts to recover the left eye by creating a triangle defined by the coordinates of the right eye $(x_2, y_2)_{t+1}$, the mouth $(x_3, y_3)_{t+1}$, and any of the candidate features $(x_i, y_i)'$, starting with the candidate facial feature with the lowest characteristic similarity measure $D_{ij}$. If the conditions of Equation (17) are met, then the candidate facial feature under consideration corresponds with the left eye.

The processor 205 then determines in sub-step 946 whether a facial feature corresponding to the left eye was found in sub-step 944. If a facial feature corresponding to the left eye was found then, in sub-step 948 the processor 205 saves the position $(x_i, y_i)'$ of the candidate facial feature corresponding to the left eye as coordinates $(x_1, y_1)_{t+1}$, together with its area $A'_1$ as area $A_1$ and its eccentricity $\epsilon'_i$ as eccentricity $\epsilon_1$. Step 155 also ends.

If it is determined in sub-step 942 that the coordinates $(x_1, y_1)_t$ of the left eye were known in the previous frame, or if it is determined in sub-step 946 that a facial feature corresponding to the left eye was not found, then the left eye disappeared in the current frame. Step 155 proceeds to sub-step 950 where the processor 205 sets the coordinates $(x_1, y_1)_{t+1}$ to "unknown". Step 155 also ends after sub-step 950.

Figure 6F:
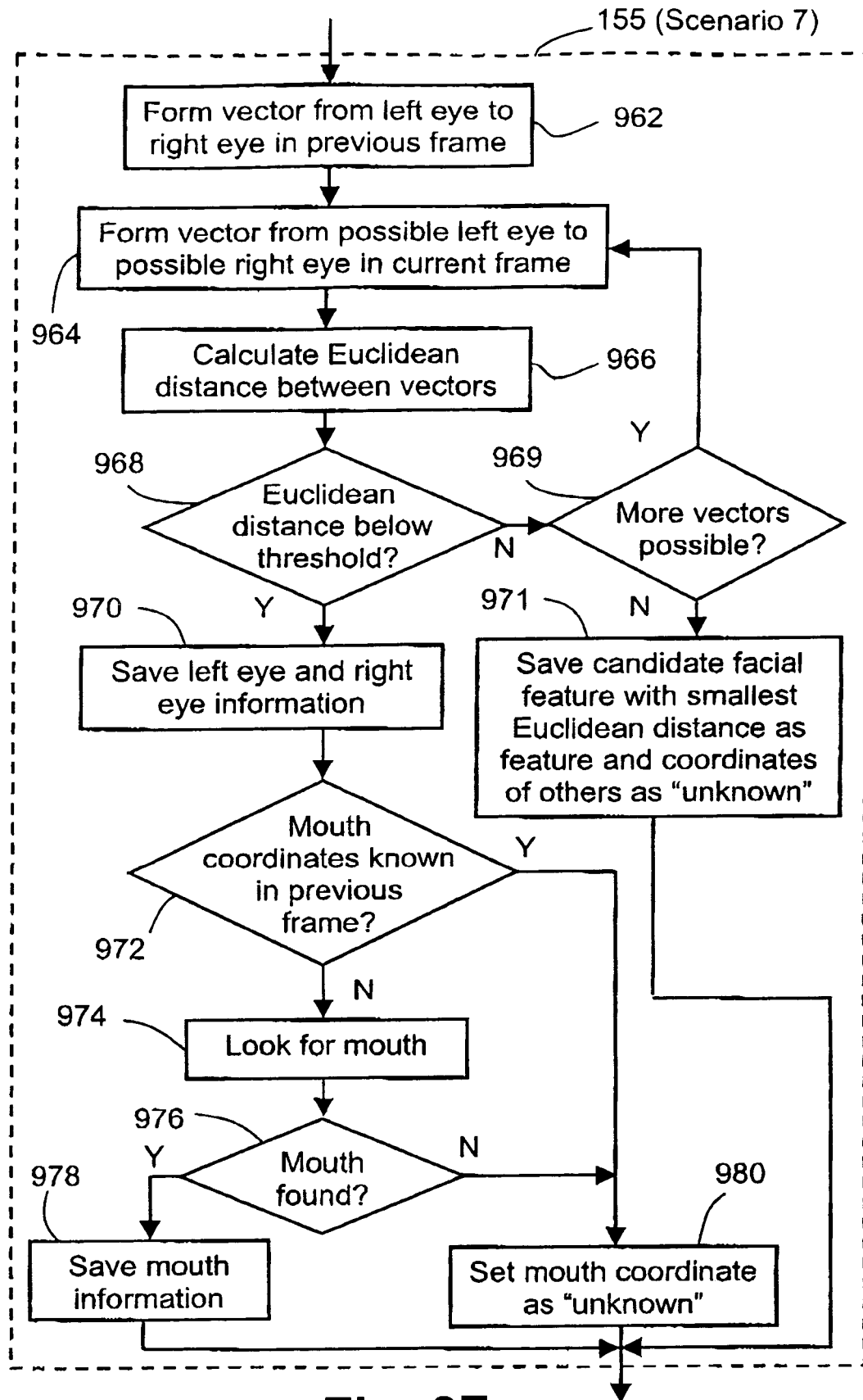

In the case when scenario 7 exists, each of the eyes has at least one corresponding candidate facial feature. FIG. 6F shows a flow diagram of the sub-steps of step 155 in the case when scenario 7 exists. Step 155 for this scenario starts in sub-step 962 where the processor 205 forms a vector $(x_2-x_1, y_2-y_1)_t$ from the left eye to the right eye in the previous frame. A vector is also formed in sub-step 964 from a possible candidate facial feature in list $L_1$ to a possible candidate facial feature in list $L_2$.

The processor 205 then calculates in sub-step 966 the Euclidean distance between the vectors formed in sub-steps 962 and 964 respectively. The processor 205 then determines in sub-step 968 whether the Euclidean distance is below a threshold. If the Euclidean distance is not below the threshold, then processor 205 determines in sub-step 969 whether another vector can be formed in sub-step 964 with a different combination of possible candidate facial features in lists $L_1$ and $L_2$. If another vector can be formed, then control is passed to sub-step 964 from where sub-steps 964 to 968 are repeated.

If another vector can not be formed with a different combination of possible candidate facial features in lists $L_1$ and $L_2$ then, in sub-step 971, the possible candidate facial feature in lists $L_1$ and $L_2$ with the smallest Euclidean distance $d_{i1}$ or $d_{i2}$ (calculated in step 150) is assigned as corresponding to the corresponding feature by saving its information, while the coordinates of the other two features are set to "unknown". Step 155 then ends.

If the processor 205 determines in sub-step 968 that the Euclidean distance is below the threshold, then processor 205 saves the information of the two possible candidate facial features forming the vector as the left eye and right eye respectively.

The processor 205 then determines in sub-step 972 whether the coordinates $(x_3, y_3)_t$ of the mouth were known in the previous frame. If the coordinates $(x_3, y_3)_t$ of the mouth were not known, then the mouth was not detected in the previous frame, but may have reappeared in the current frame. Accordingly, sub-step 974 attempts to recover the mouth by creating a triangle defined by the coordinates of the left eye $(x_1, y_1)_{t+1}$, the right eye $(x_2, y_2)_{t+1}$, and any of the candidate features $(x_i, y_i)'$, starting with the candidate facial feature with the lowest characteristic similarity measure $D_{ij}$. If the conditions of Equation (17) are met, then the candidate facial feature under consideration corresponds with the mouth.

The processor 205 then determines in sub-step 976 whether a facial feature corresponding to the mouth was found in sub-step 974. If a facial feature corresponding to the mouth was found then, in sub-step 978 the processor 205 saves the position $(x_i, y_i)'$ of the candidate facial feature corresponding to the mouth as coordinates $(x_3, y_3)_{t+1}$, together with its area $A'_i$ as area $A_3$ and its eccentricity $\epsilon'_i$ as eccentricity $\epsilon_3$. Step 155 also ends.

If it is determined in sub-step 972 that the coordinates $(x_3, y_3)_t$ of the mouth were known in the previous frame, or if it is determined in sub-step 976 that a facial feature corresponding to the mouth was not found, then the mouth disappeared in the current frame. Step 155 proceeds to sub-step 980 where the processor 205 sets the coordinates $(x_3, y_3)_{t+1}$ to "unknown", Step 155 also ends after sub-step 920.

Figure 6G:
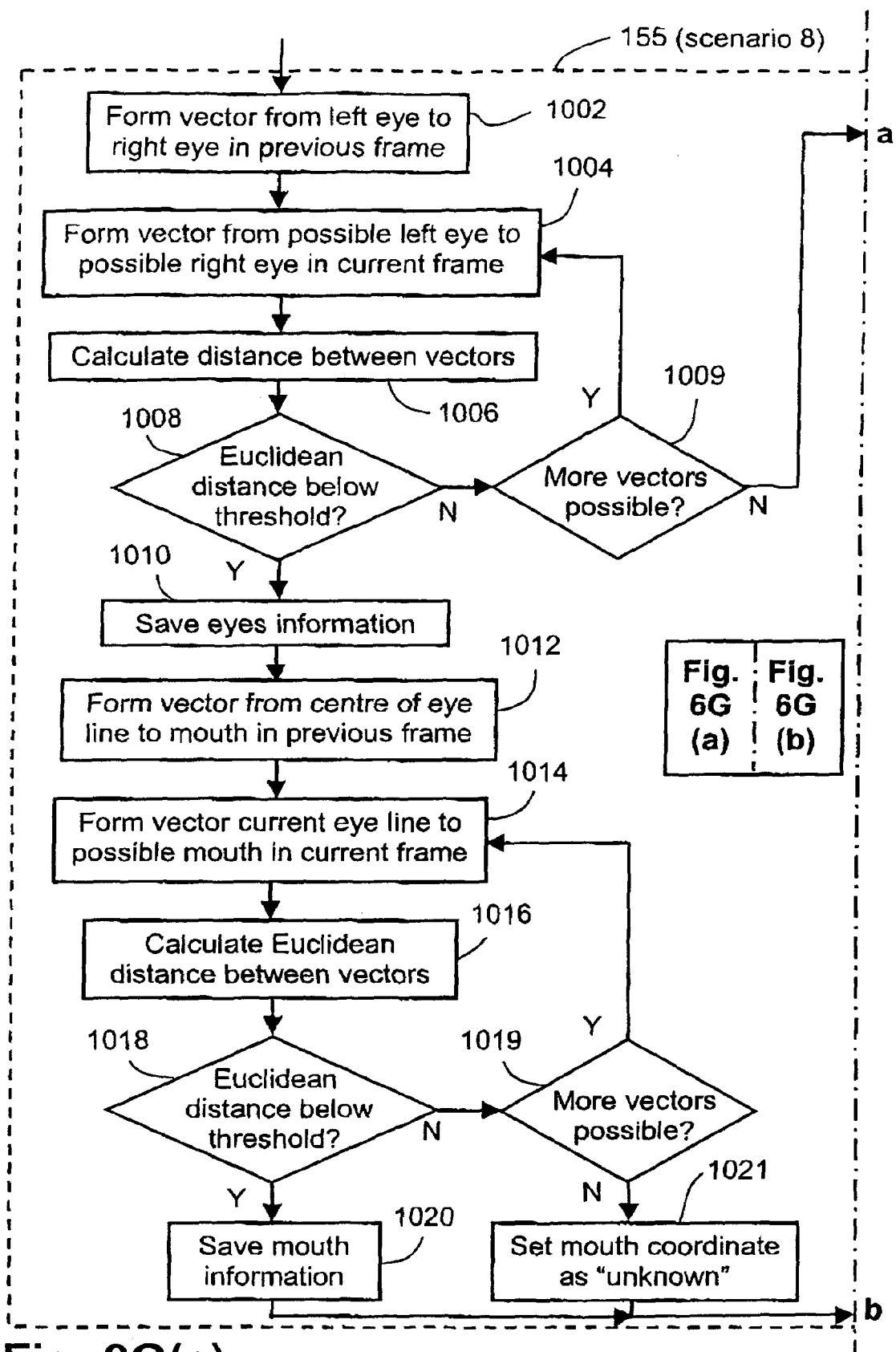
Figure 6G:
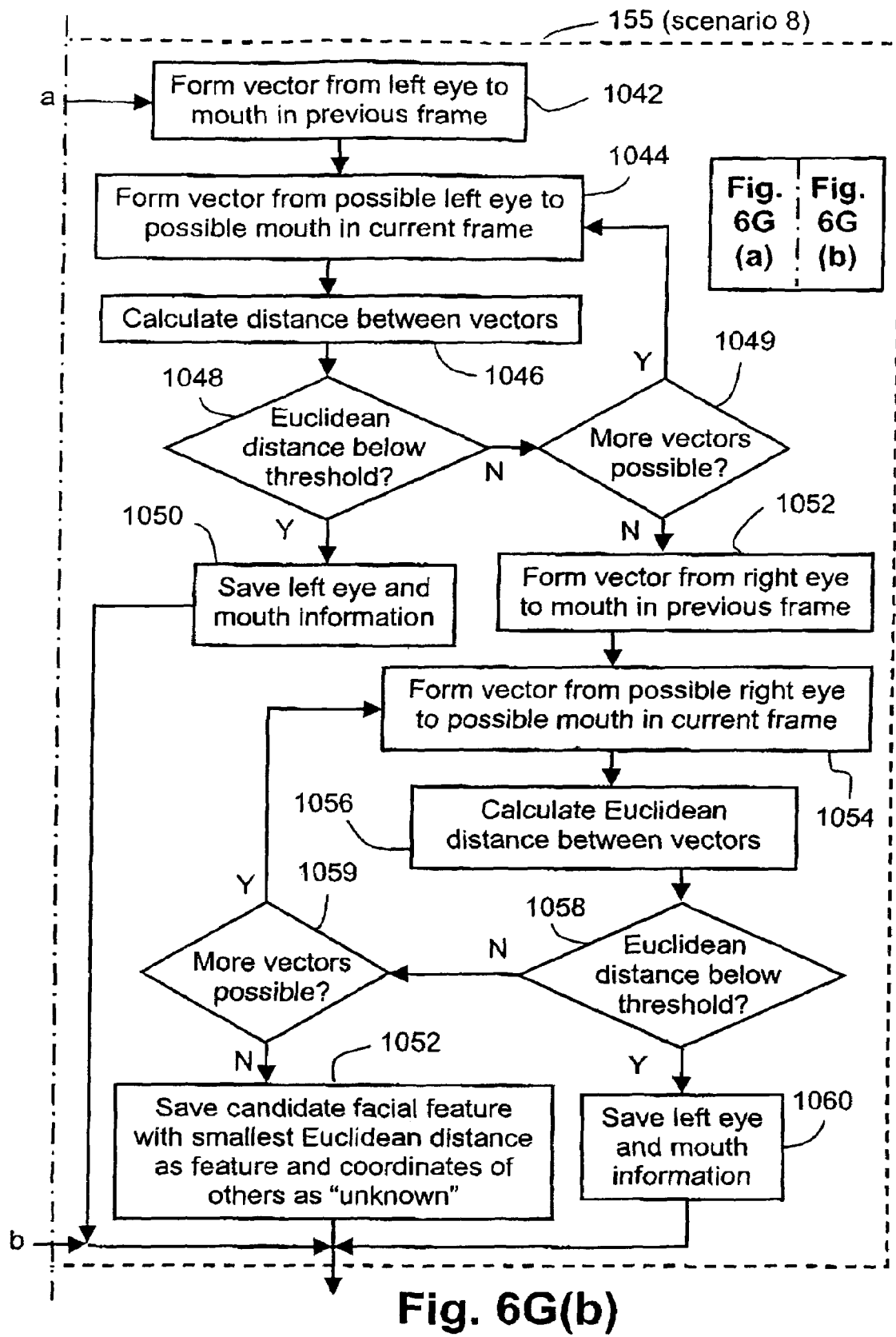

Finally, in the case when scenario 8 exists, each of the eyes and the mouth has at least one corresponding candidate facial feature. FIG. 6G shows a flow diagram of the sub-steps of step 155 in the case when scenario 8 exists. In this case step 155 starts in sub-step 1002 where the processor 205 forms a vector $(x_2-x_1, y_2-y_1)_t$ from the left eye to the right eye in the previous frame. A vector is also formed in sub-step 1004 from a possible candidate facial feature in list $L_1$ to a possible candidate facial feature in list $L_2$.

The processor 205 then calculates in sub-step 1008 the Euclidean distance between the vectors formed in sub-steps 1002 and 1004 respectively. The processor 205 then determines in sub-step 1008 whether the Euclidean distance is below a threshold. If the Euclidean distance is not below the threshold, then processor 205 determines in sub-step 1009 whether another vector can be formed in sub-step 1004 with a different combination of possible candidate facial features in lists $L_1$ and $L_2$. If another vector can be formed, then control is passed to sub-step 1004 from where sub-steps 1004 to 1008 are repeated.

If the processor 205 determines in sub-step 1008 that the Euclidean distance is below the threshold, then processor 205 saves in sub-step 1010 the information of the two possible candidate facial feature forming the vector as the left eye and right eye respectively. With the coordinates of the eyes now known, the processor 205 forms in sub-step 1012 a vector $$\left(x_3 - \frac{1}{2}(x_2 - x_1), y_3 - \frac{1}{2}(y_2 - y_1)\right)_t$$

from the centre of the eye-eye line to the mouth in the previous frame. A vector is also formed in sub-step 1014 from the centre of the current eye-eye line, which is at $$\left(\frac{1}{2}(x_2 - x_1), \frac{1}{2}(y_2 - y_1)\right)_{t+1},$$

to a possible candidate facial feature in list $L_3$.

The processor 205 then calculates in sub-step 1016 the Euclidean distance between the vectors formed in sub-steps 1012 and 1014 respectively. The processor 205 then determines in sub-step 1018 whether the Euclidean distance is below a threshold. If the Euclidean distance is not below the threshold, then processor 205 determines in sub-step 1019 whether another vector can be formed in sub-step 1014 with a different possible candidate facial feature from lists $L_3$. If another vector can be formed, then control is passed to sub-step 1014 from where sub-steps 1014 to 1018 are repeated.

If another vector can not be formed with a different combination of possible candidate facial feature from lists $L_3$ then, in sub-step 1021, the processor 205 sets the coordinates $(x_3, y_3)_{t+1}$ to "unknown". Step 155 also ends after sub-step 1021.

If the processor 205 determines in sub-step 1018 that the Euclidean distance is below the threshold, then processor 205 saves in sub-step 1020 the position $(x_i, y_i)'$ of the candidate facial feature corresponding to the mouth as coordinates $(x_3, y_3)_{t+1}$, together with its area $A'_i$ as area $A_3$ and its eccentricity $\epsilon'_i$ as eccentricity $\epsilon_3$. Step 155 also ends.

If another vector can not be formed with a different combination of possible candidate facial features in lists $L_1$ and $L_2$ then, in sub-step 1042, the processor 205 forms a vector $(x_3-x_1, y_3-y_1)_t$ from the left eye to the mouth in the previous frame. A vector is also formed in sub-step 1044 from a possible candidate facial feature in list $L_1$ to a possible candidate facial feature in list $L_3$.

The processor 205 then calculates in sub-step 1046 the Euclidean distance between the vectors formed in sub-steps 1042 and 1044 respectively. The processor 205 then determines in sub-step 1048 whether the Euclidean distance is below a threshold.

If the Euclidean distance is below the threshold, then processor 205 saves the information of the two possible candidate facial feature forming the vector as the left eye and mouth respectively in sub-step 1050 before step 155 ends If the Euclidean distance is not below the threshold, then processor 205 determines in sub-step 1049 whether another vector can be formed in sub-step 1044 with a different combination of possible candidate facial features in lists $L_1$ and $L_3$. If another vector can be formed, then control is passed to sub-step 1044 from where sub-steps 1044 to 1048 are repeated.

If another vector can not be formed with a different combination of possible candidate facial features in lists $L_1$ and $L_3$ then, in sub-step 1052, the processor 205 forms a vector $(x_3-x_2, y_3-y_2)_t$ from the right eye to the mouth in the previous frame. A vector is also formed in sub-step 1054 from a possible candidate facial feature in list $L_2$ to a possible candidate facial feature in list $L_3$.

The processor 205 then calculates in sub-step 1056 the Euclidean distance between the vectors formed in sub-steps 1052 and 1054 respectively. The processor 205 then determines in sub-step 1058 whether the Euclidean distance is below a threshold. If the Euclidean distance is not below the threshold, then processor 205 determines in sub-step 1059 whether another vector can be formed in sub-step 1054 with a different combination of possible candidate facial features in lists $L_2$ and $L_3$. If another vector can be formed, then control is passed to sub-step 1054 from where sub-steps 1054 to 1058 are repeated.

If another vector can not be formed with a different combination of possible candidate facial features in lists $L_2$ and $L_3$ then, in sub-step 1062, the possible candidate facial feature in lists $L_1$, $L_2$ and $L_3$ with the smallest Euclidean distance $d_{i1}$, $d_{i2}$ or $d_{i3}$ (calculated in step 150) is assigned as corresponding to the corresponding feature by saving its information, while the coordinates of the other two features are set to "unknown". Step 155 then ends.

If the processor 205 determines in sub-step 1058 that the Euclidean distance is below the threshold, then processor 205 saves the information of the two possible candidate facial features forming the vector as the right eye and mouth respectively.

In summary, irrespective of which scenario exists, step 155 assigns one of the possible candidate facial features to each facial feature for tracking if possible, and attempts to recover facial features where appropriate using known geometric relations between facial features.

Referring again to FIG. 1, after performing step 155 the processor 205 determines in step 160 whether there are any more frames available. If no more frames are available for processing, then method 100 ends in step 180.

If more frames are available for processing, then method 100 continues to step 170 where a new frame is received by the processor 205. The new frame is added to the block of pixel data, while the oldest frame in the block is removed from the block. The segmentation step 120 is again performed on the updated block of pixel data.

After the segmentation step 120 described with reference to FIG. 3 has been performed a first time, in subsequent execution of the segmentation step 120 the 3D segments $S_i$ formed in a previous segmentation are maintained in sub-step 304. The pixels of the new frame are added to the data structure representing the current segment $S_i$ as new individual segments, each with model parameter $\bar{a}(x, y, n)$ set to the colour value $\phi(x, y, n)$, and observing the correct adjacency relations with existing segments $S_i$. The effect of the segmentation step 120 is thus to merge the unsegmented pixels of the new frame into the existing 3D segments $S_i$ from a previous segmentation. However, the model parameter $\bar{a}(x, y, n)$ of those existing segments $S_i$ from a previous segmentation may adjust due to the information contained in the new frame.

The sequence of coordinates $(x_j, y_j)_t$ provides the positions of the features in each frame t. It is noted that the coordinates $(x_j, y_j)_t$ are transformed back to the coordinate system of the frames before outputting the same.

The foregoing describes only some embodiments of the present invention, and modifications and/or changes can be made thereto without departing from the scope and spirit of the invention, the embodiments being illustrative and not restrictive. The embodiment described tracks the facial features of a single face, but it would be understood by those skilled in the art that the facial features of any number of faces may be tracked in the same manner.

I claim:

1. A method of tracking facial features in a video sequence, said method comprising the steps of:
   (a) receiving facial features for tracking in a first frame of said video sequence;
   (b) spatiotemporally segmenting said video sequence to provide a sequence of associated two-dimensional segments, a first two-dimensional segment in said sequence of associated two-dimensional segments including said facial features for tracking;
   (c) identifying candidate facial features in a second two-dimensional segment in a second frame of said video sequence, said second two-dimensional segment being one of said sequence of associated two-dimensional segments; and
   (d) verifying which of said candidate facial features correspond with said facial features for tracking.

2. A method as claimed in claim 1 comprising the further step of:
   (e) recovering lost facial features by using known geometric relations between facial features.

3. A method as claimed in claim 1 wherein step (c) comprises the sub-steps of:
   (ci) forming a sub-image including said second two-dimensional segment in said sequence of associated two-dimensional segments;
   (cii) normalising the size of said sub-image; and
   (ciii) identifying candidate facial features in said normalised sub-image.

4. A method as claimed in 1 wherein step (d) measures the correspondence between said candidate facial features and said facial features for tracking.

5. A method as claimed in claim 4 wherein step (d) comprises determining whether said candidate facial features are within a region of said facial features for tracking in a previous frame.

6. A method as claimed in claim 5 wherein step (d) further comprises determining whether said candidate facial features within each of said regions are similar in shape to said facial features for tracking in said previous frame.

7. An apparatus for tracking facial features in a video sequence, said apparatus comprising:
   means for receiving facial features for tracking in a first frame of said video sequence;
   means for spatiotemporally segmenting said video sequence to provide a sequence of associated two-dimensional segments, a first two-dimensional segment in said sequence of associated two-dimensional segments including said facial features for tracking;
   means for identifying candidate facial features in a second two-dimensional segment in a second frame of said video sequence, said second two-dimensional segment being one of said sequence of associated two-dimensional segments; and
   means for verifying which of said candidate facial features correspond with said facial features for tracking.

8. An apparatus as claimed in claim 7 further comprising: means for recovering lost facial features by using known geometric relations between facial features.

9. An apparatus as claimed in claim 7 wherein said means for identifying comprises:
   means for forming a sub-image including said second two-dimensional segment in said sequence of associated two-dimensional segments;
   means for normalising the size of said sub-image; and means for identifying candidate facial features in said normalised sub-image.

10. A program stored on a memory medium for tracking facial features in a video sequence, said program comprising:
   code for receiving facial features for tracking in a first frame of said video sequence;
   code for spatiotemporally segmenting said video sequence to provide a sequence of associated two-dimensional segments, a first two-dimensional segment in said sequence of associated two-dimensional segments including said facial features for tracking;
   code for identifying candidate facial features in at least a second two-dimensional segment in a second frame of said video sequence, said second two-dimensional segment being one of said sequences of associated two-dimensional segments; and
   code for verifying which of said candidate facial features correspond with said facial features for tracking.

11. A program as claimed in claim 10 further comprising:
   code for recovering lost facial features by using known geometric relations between facial features.

12. A program as claimed in claim 10 wherein said code for identifying comprises:
   code for forming a sub-image including said second two-dimensional segment in said sequence of associated two-dimensional segments;
   code for normalising the size of said sub-image; and
   code for identifying candidate facial features in said normalised sub-image.

* * * * *

UNITED STATES PATENT AND TRADEMARK OFFICE
CERTIFICATE OF CORRECTION

PATENT NO. : 7,352,881 B2  Page 1 of 3
APPLICATION NO. : 10/663689
DATED : April 1, 2008
INVENTOR(S) : Fabrice Lestideau It is certified that error appears in the above-identified patent and that said Letters Patent is hereby corrected as shown below:

Cover Page,
    Item (56)    References Cited (U.S. Patent Documents) insert
    --5,802,220    9/1998    Black et al.
    6,009,210    12/1999    Kang--.

(Other Publications) insert
--J. Yang, et al., "Real-time face and facial feature tracking and applications", Proceedings of Workshop on Audio-Visual Speech Processing, Terrigal, NSW Australia, 1998, pp. 79-84.
D. DeCarlo, et al., "Optical flow constraints and deformable models with applicants to face tracking", International Journal of Computer Vision, Vol. 38 (2), July 2000, pp. 99-127.--.

Sheet 12,    Fig. 6G(a),    "centre" should read --center--.

Col. 1, line 9,    "2003" should read --2002--.

line 48,    "feature" should read --features--.

Col. 3, line 3,    "follows" should read --follow--.

line 27,    "device" should read --device.--.

line 48,    "executing" should read --executed--.

line 62,    "as" should read --an--.

Col. 4, line 54,    "that" should read --that:--.

Col. 5, line 21,    "as" should read --as:--.

Col. 6, line 47,    "by" should be --by:--.

Col. 8, line 44,    "cause" should read --causes--.

Col. 11, line 38,    "frame" should read --frame.--.

UNITED STATES PATENT AND TRADEMARK OFFICE
CERTIFICATE OF CORRECTION

| | |
|---|---|
| PATENT NO. | : 7,352,881 B2 |
| APPLICATION NO. | : 10/663689 |
| DATED | : April 1, 2008 |
| INVENTOR(S) | : Fabrice Lestideau |

It is certified that error appears in the above-identified patent and that said Letters Patent is hereby corrected as shown below:

Col. 12, line 1, "$(0.9<a_1<1.45)$ AND $(0.9<a_221<1.45)$ AND $(10<\delta<15)$" should read --$(0.9<a_1<1.45)$ AND $(0.9<a_2<1.45)$ AND $(10<\delta<15)$--.

line 44, "area." should read --area--.

Col. 16, line 6, ""unknown"" should read --"unknown".--.

line 10, "feature" should read --features--.

Col. 17, line 37, ""unknown"" should read --"unknown".--.

line 64, "feature" should read --features--.

Col. 18, line 29, "feature" should read --features--.

line 53, "feature" should read --features--.

line 54, "ends" should read --ends.--.

Col. 20, line 20, "claim 1" should read --claim 1,--.

line 24, "claim 1" should read --claim 1,--.

line 32, "in 1" should read --in claim 1,--.

line 35, "claim 4" should read --claim 4,--.

line 39, "claim 5" should read --claim 5,--.

line 59, "claim 7" should read --claim 7,--.

line 62, "claim 7" should read --claim 7,--.

UNITED STATES PATENT AND TRADEMARK OFFICE
CERTIFICATE OF CORRECTION

PATENT NO. : 7,352,881 B2
APPLICATION NO. : 10/663689
DATED : April 1, 2008
INVENTOR(S) : Fabrice Lestideau It is certified that error appears in the above-identified patent and that said Letters Patent is hereby corrected as shown below:

Col. 22, line 3, "claim 10" should read --claim 10,--.

line 6, "claim 10" should read --claim 10,--.

Signed and Sealed this

Sixth Day of January, 2009

JON W. DUDAS
*Director of the United States Patent and Trademark Office*